(12) United States Patent
Yamamoto et al.

(10) Patent No.: US 12,075,424 B2
(45) Date of Patent: Aug. 27, 2024

(54) COMMUNICATION APPARATUS AND COMMUNICATION METHOD

(71) Applicant: Panasonic Intellectual Property Corporation of America, Torrance, CA (US)

(72) Inventors: Tetsuya Yamamoto, Kanagawa (JP); Hongchao Li, Hessen (DE); Hidetoshi Suzuki, Kanagawa (JP); Takashi Iwai, Ishikawa (JP)

(73) Assignee: Panasonic Intellectual Property Corporation of America, Torrance, CA (US)

(*) Notice: Subject to any disclaimer, the term of this patent is extended or adjusted under 35 U.S.C. 154(b) by 0 days.

(21) Appl. No.: 18/457,953

(22) Filed: Aug. 29, 2023

(65) Prior Publication Data

US 2023/0403710 A1    Dec. 14, 2023

Related U.S. Application Data

(63) Continuation of application No. 18/149,521, filed on Jan. 3, 2023, now Pat. No. 11,785,606, which is a continuation of application No. 17/264,263, filed as application No. PCT/JP2019/015885 on Apr. 12, 2019, now Pat. No. 11,601,926.

(30) Foreign Application Priority Data

Aug. 1, 2018   (JP) .................................. 2018-144984

(51) Int. Cl.
*H04W 28/04*   (2009.01)
*H04W 72/21*   (2023.01)
*H04W 72/54*   (2023.01)

(52) U.S. Cl.
CPC ........... *H04W 72/21* (2023.01); *H04W 28/04* (2013.01); *H04W 72/54* (2023.01)

(58) Field of Classification Search
CPC .............................. H04W 72/21; H04W 72/54
USPC ........................................................ 370/329
See application file for complete search history.

(56) References Cited

U.S. PATENT DOCUMENTS

2010/0309865 A1    12/2010   Kimura

FOREIGN PATENT DOCUMENTS

WO    2019016951 A1    1/2019

OTHER PUBLICATIONS

3GPP TS 38.211 V15.2.0, "3rd Generation Partnership Project; Technical Specification Group Radio Access Network; NR; Physical channels and modulation (Release 15)," Jun. 2018, 96 pages.

(Continued)

*Primary Examiner* — Angel T Brockman
(74) *Attorney, Agent, or Firm* — Seed IP Law Group LLP

(57) ABSTRACT

Provided is a terminal that can appropriately transmit an uplink signal. In a terminal (200), a control unit (211) determines a processing mode with respect to uplink data and uplink control information according to a requirement for at least one of uplink data and uplink control information when transmission of an uplink data channel that includes the uplink data and transmission of an uplink control channel that includes the uplink control information temporally overlap. A transmission unit (218) transmits the at least one of the uplink data and the uplink control information on the basis of the determined processing mode.

18 Claims, 14 Drawing Sheets

(56) References Cited

OTHER PUBLICATIONS

3GPP TS 38.212 V15.2.0, "3rd Generation Partnership Project; Technical Specification Group Radio Access Network; NR; Multiplexing and channel coding (Release 15)," Jun. 2018, 98 pages.
3GPP TS 38.213 V15.2.0 "3rd Generation Partnership Project; Technical Specification Group Radio Access Network; NR; Physical layer procedures for control (Release 15)," Jun. 2018, 99 pages.
3GPP TS 38.214 V15.2.0, "3rd Generation Partnership Project; Technical Specification Group Radio Access Network; NR; Physical layer procedures for data (Release 15)," Jun. 2018, 95 pages.
Extended European Search Report, dated Sep. 8, 2021, for European Application No. 19845199.9—1215, 9 pages.
Huawei, HiSilicon, "Discussion on partially overlapped PUCCH and PUSCH for URLLC," R1-1806895, Agenda Item: 7.1.3.2.5, 3GPP TSG RAN WG1 Meeting #93, Busan, Korea, May 21-25, 2018, 7 pages.
Huawei, HiSilicon, "Discussion on UCI feedback for URLLC," R1-1800054, Agenda Item: 7.3.2.5, 3GPP TSG RAN WG1 Ad Hoc Meeting, Vancouver, Canada, Jan. 22-26, 2018, 13 pages.
International Search Report, mailed Jun. 4, 2019, for corresponding International Application No. PCT/JP2019/015885, 3 pages.
Lenovo, Motorola Mobility, "Remaining issues on UCI multiplexing on PUSCH," R1-1807604, Agenda Item: 7.1.3.2.3, 3GPP TSG RAN WG1 Meeting # 93, Busan, Korea, May 21-25, 2018, 8 pages.
Office Action, dispatched Sep. 28, 2022, for Indian Patent Application No. 202147003272. (5 pages).
Qualcomm Incorporated, "Handling UCI on PUSCH for URLLC," R1-1807360, Agenda Item: 7.1.3.2.3, 3GPP TSG RAN WG1 Meeting #93, Busan, Korea, May 21-25, 2018, 4 pages.
Shariatmadari et al., "Control Channel Enhancements for Ultra-Reliable; Low-Latency Communications," Department of Communications and Networking, Aalto University, May 2017, 6 pages.
Wilus Inc., "UCI multiplexing considering URLLC data in PUSCH," R1-1805246, Agenda Item: 7.2.4, 3GPP TSG RAN WG1 Meeting #92bis, Sanya, China, Apr. 16-20, 2018, 3 pages.

COMMUNICATION APPARATUS AND COMMUNICATION METHOD

TECHNICAL FIELD

The present disclosure relates to a terminal and a communication method.

BACKGROUND ART

The specification for designing Release 15 of New Radio access technology (NR) has been completed for implementing the 5th Generation mobile communication systems (5G) in the 3rd Generation Partnership Project (3GPP). NR supports Ultra Reliable and Low Latency Communication (URLLC) as well as high-speed and large capacity communication, which are basic requirements of enhanced Mobile Broadband (eMBB) (e.g., see Non-Patent Literatures (hereinafter, referred to as "NPL") 1 to 4).

The requirements for URLLC in Release 15 defined by 3GPP are to achieve user plane latency of 0.5 ms or less each way and to achieve latency of 1 ms or less with constant reliability.

Release 15 NR achieves the low latency by flexibly controlling subcarrier spacings or the number of transmission symbols, and shortening Transmit Time Intervals (TTIs). In addition, highly reliable data transmission is implemented by configuring or indicating Modulation and Coding Schemes (MCSs) or Channel Quality Indicators (CQIs) to achieve a low target Block Error Rate (BLER). For example, a target error rate (or a target BLER) may be configured for a normal mode (e.g., BLER=$10^{-1}$) or a high reliability mode (e.g., BLER=$10^{-5}$)

CITATION LIST

Non-Patent Literature

NPL 1
3GPP TS 38.211 V15.2.0, "NR; Physical channels and modulation (Release 15)," June 2018.
NPL 2
3GPP TS 38.212 V15.2.0, "NR; Multiplexing and channel coding (Release 15)," June 2018.
NPL 3
3GPP TS 38.213 V15.2.0, "NR; Physical layer procedures for control (Release 15)," June 2018.
NPL 4
3GPP TS 38.214 V15.2.0, "NR; Physical layer procedures for data (Release 15)," June 2018.
NPL 5
H. Shariatmadari, Z. Li, S. Iraji, M. A. Uusitalo, and R. Jantti, "Control channel enhancements for ultra-reliable low-latency communications," Proc. The 10th International Workshop on Evolutional Technologies and Ecosystems for 5G and Beyond (WDN-5G ICC2017), May 2017.

SUMMARY OF INVENTION

Transmission methods for uplink signals in NR have not been fully studied.

One non-limiting and exemplary embodiment facilitates providing a terminal, and a communication method each capable of appropriately transmitting uplink signals.

A terminal according to an embodiment of the present disclosure includes: circuitry, which, in operation, determines a processing mode for uplink data and uplink control information according to a requirement for at least either of the uplink data and the uplink control information when transmission of an uplink data channel including the uplink data and transmission of an uplink control channel including the uplink control information overlap in time with each other; and a transmitter, which in operation, transmits at least either of the uplink data and the uplink control information based on the determined processing mode.

A communication method according to an embodiment of the present disclosure includes: determining a processing mode for uplink data and uplink control information according to a requirement for at least either of the uplink data and the uplink control information when transmission of an uplink data channel including the uplink data and transmission of an uplink control channel including the uplink control information overlap in time with each other; and transmitting at least either of the uplink data and the uplink control information based on the determined processing mode.

It should be noted that general or specific embodiments may be implemented as a system, an apparatus, a method, an integrated circuit, a computer program, a storage medium, or any selective combination thereof.

According to an embodiment of the present disclosure, it is possible to appropriately transmit uplink signals.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Figure 1:
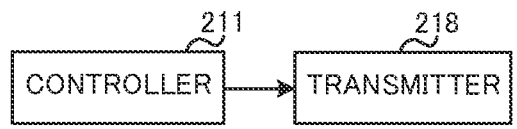
FIG. 1 is a block diagram illustrating a configuration of a part of a terminal according to Embodiment 1.

Hereinafter, detailed descriptions will be given of embodiments of the present disclosure with reference to the accompanying drawings.

Cell throughput or frequency utilization efficiency is required to be maximized in use cases of eMBB in Long-Term Evolution (LTE) or NR. In such a case, a target error rate of data is generally configured to be relatively high (e.g., BLER=$10^{-1}$) in the operation. This is because of the application of Hybrid Automatic Repeat Request (HARQ). For example, eMBB allows to eventually achieve highly reliable packet transmission (e.g., BLER=$10^{-5}$) taking into consideration of a combining gain of some retransmissions by HARQ.

URLLC, however, is required to achieve highly reliable packet transmission (e.g., BLER=$10^{-5}$) with latency of 1 ms or less. In the HARQ described above, for example, the occurrence of a data transmission error causes a retransmission request, and the data is retransmitted accordingly. The latency increases as the number of retransmissions increases, and the requirement of low latency can no longer be met in this case. Thus, in URLLC, it is conceivable to operate so as to surely transmit the data in the first transmission by the above-described high reliability mode, i.e. the mode where the target error rate of the data is configured to be relatively low (e.g., BLER=$10^{-5}$), to achieve the highly reliable packet transmission without retransmissions by HARQ.

Although the configuration of a low target error rate leads to highly reliable data transmission, it requires more radio resources than the case of configuring a high target error rate. In Release 15 NR, the data size of URLLC is limited to 32 bytes, which is relatively small, and thus the configuration of the low target error rate does not cause so much influence on the resource utilization efficiency.

Release 16 or future URLLC, however, is expected to handle a larger data size than Release 15 NR and expand use cases of URLLC. In this case, the configuration of the low target error rate possibly needs a huge amount of radio resources to achieve the highly reliable packet transmission by a single transmission, and this is inefficient from the viewpoint of the resource utilization efficiency.

Thus, it is assumed to apply, for example, a fast HARQ retransmission control in the URLLC use cases handling a relatively large data size. The fast HARQ retransmission control is so operated that the high target error rate (e.g., BLER=$10^{-1}$ or BLER=$10^{-2}$) is configured for the first transmission and even when an error occurs in the first transmission, the data is surely transmitted in the retransmission following the first transmission (the second transmission), for example. As described above, the fast HARQ retransmission control is effective for performing the highly reliable packet transmission with low latency while improving the resource utilization efficiency.

Focusing on HARQ transmission in downlink here, a terminal (User Equipment (UE)) transmits a response signal indicating an error detection result of downlink data (Acknowledgement/Negative Acknowledgement (ACK/NACK), or also referred to as HARQ-ACK) to a base station (e.g., eNB or gNB) using an uplink control channel (e.g., Physical Uplink Control Channel (PUCCH)).

At this time, the required reliability or the latency requirement for the response signal transmission differs in accordance with the reliability, the latency requirement or the type of use cases/services (or usage scenarios) of the downlink data transmission.

Assuming the operation in URLLC that when an error occurs in the first transmission, the data can be surely transmitted in the next transmission (the retransmission), for example, the higher the target error rate of the first data transmission is, the higher reliability is required for the transmission of the response signal, i.e. the response signal transmission with a lower target error rate is required. For example, when the target error rate of the first data transmission is BLER=$10^{-1}$, the required error rate for the response signal is BLER=$10^{-4}$ or less, and when the target error rate of the first data transmission is BLER=$10^{-3}$, the required error rate for the response signal is BLER=$10^{-2}$ or less (see, for example, NPL 5).

Incidentally, comparing eMBB and URLLC, lower latency is required for the response signal to the URLLC data transmission than the response signal to the eMBB data transmission.

Terminals in NR are assumed to support a plurality of types of use cases or services (e.g., eMBB and URLLC). The terminals in NR are also assumed to support a plurality of URLLC data transmissions with different target error rates in URLLC. This situation possibly causes simultaneous transmission in uplink of the response signals corresponding to downlink data transmissions with different reliability, latency requirements, or types of use cases (or services) and of uplink data in the same slot.

In NR, when PUCCH transmission including Uplink Control Information (UCI) such as response signals and Physical Uplink Shared Channel (PUSCH) transmission including uplink data (e.g., Uplink-Shared Channel (UL-SCH)) overlap in time with each other, a terminal supports "UCI on PUSCH" which is a method of transmitting a UCI by multiplexing the UCI on PUSCH (see NPLs 2 and 3, for example).

When a response signal, which is one of UCIs, is multiplexed on PUSCH, for example, the resource amount (the number of Resource Elements (REs)) $Q'_{ACK}$ to be allocated for the response signal in the PUSCH is calculated by the following Equation 1, (Equation 1)

$$Q'_{ACK} = \min\left\{ \left\lceil \frac{(O_{ACK} + L_{ACK}) \cdot \beta_{offset}^{HARQ-ACK} \cdot \sum_{i=0}^{N_{symbol,all}^{PUSCH}-1} M_{SC}^{UCI}(l)}{\sum_{r=0}^{C_{UL-SCH}-1} K_r} \right\rceil, \left\lceil \alpha \cdot \sum_{i=l_0}^{N_{symbol,all}^{PUSCH}-1} M_{SC}^{UCI}(l) \right\rceil \right\} \quad [1]$$

wherein,
$O_{ACK}$: Number of bits of response signal
$L_{ACK}$: Number of Cyclic Redundancy Check (CRC) bits for response signal
$\beta_{offset}^{HARQ-ACK}$: Parameter for controlling coding rate of response signal
$C_{UL-SCH}$: Number of code blocks for UL-SCH transmitted in PUSCH
$K_r$: Code block size of the r-th code block
$M_{sc}^{UCI}(l)$: Number of REs available for UCI transmission in the l-th Orthogonal Frequency Division Multiplexing (OFDM) symbol
$N_{symbol,all}^{PUSCH}$: Number of OFDM symbols for PUSCH
$\alpha$: Parameter for controlling upper limit of resource amount allocated for response signal in PUSCH.

In Equation 1, the larger the value of $\beta_{offset}^{HARQ-ACK}$ is, the more resources are allocated for the response signal, in general. Additionally, in Equation 1, the larger the value of α is, the larger the upper limit of the resource amount allocated for the response signal becomes.

In Release 15 NR, however, studies have not been fully carried out on the operations related to response signals and uplink data (UL-SCH) with different reliability, latency requirements, or types of use cases (or services) in the "UCI on PUSCH".

When the reliability required for a response signal to be multiplexed on PUSCH is higher than the reliability required for uplink data, for example, more resources are assumed to be allocated for the response signal in order to meet the requirement for the response signal requiring high reliability. For example, it is conceivable that at least either of the value of $\beta_{offset}^{HARQ-ACK}$ and the value of α is configured to be large in Equation 1.

In a case where the configurations of $\beta_{offset}^{HARQ-ACK}$ and α cannot be dynamically controlled (e.g., a case of semi-static configurations), however, when the values of $\beta_{offset}^{HARQ-ACK}$ and α are configured to be large and a response signal not requiring high reliability is multiplexed on PUSCH, radio resources are possibly configured as in the case of the response signal requiring high reliability (i.e., more radio resources than usual are configured). This is inefficient from the viewpoint of the resource utilization efficiency. Further, when the uplink data requires high reliability and yet extra radio resources are allocated for the response signal not requiring high reliability, the uplink data cannot be allocated sufficient radio resources. This causes a possibility of failing to meet the requirement related to the reliability of the uplink data.

In contrast, when the reliability required for the uplink data is higher than the reliability required for the response signal to be multiplexed on PUSCH, the amount of resources to be allocated for the response signal is assumed to be reduced in order to meet the requirement for the uplink data requiring high reliability. For example, it is conceivable that at least either of the value of $\beta_{offset}^{HARQ-ACK}$ and the value of α is configured to be small in Equation 1.

In the case where the configurations of $\beta_{offset}^{HARQ-ACK}$ and a cannot be dynamically controlled (e.g., the case of semi-static configurations), however, when the values of $\beta_{offset}^{HARQ-ACK}$ and a are configured to be small and the response signal requiring high reliability is multiplexed on PUSCH, the response signal cannot be allocated sufficient radio resources. This causes a possibility of failing to meet the requirement related to the reliability of the response signal.

Further, when the latency requirement is different between the response signal and the uplink data (e.g., a case of uplink data corresponding to eMBB and a response signal corresponding to URLLC), and the response signal corresponding to URLLC is transmitted by being multiplexed on PUSCH for eMBB in a terminal, for example, the transmission of PUSCH not requiring low latency (e.g., PUSCH corresponding to eMBB) becomes a bottleneck for latency in some cases.

In this regard, an embodiment of the present disclosure will describe transmission methods for response signals and uplink data with different reliability, latency requirements, or types of use cases (or services). In other words, descriptions will be given of transmission methods for response signals and uplink data according to "requirements" such as reliability, latency requirements, or types of use cases (or services).

Hereinafter, each embodiment will be described in detail.

Embodiment 1

[Overview of Communication System]

The communication system according to each embodiment of the present disclosure includes base station 100 and terminal 200.

FIG. 1 is a block diagram illustrating a configuration of a part of terminal 200 according to each embodiment of the present disclosure. In terminal 200 illustrated in FIG. 1, when transmission of an uplink data channel (e.g., PUSCH) including uplink data (e.g., UL-SCH) and transmission of an uplink control channel (e.g., PUCCH) including uplink control information (e.g., UCI) overlap in time with each other, controller 211 determines a processing mode for the uplink data and the uplink control information according to a requirement (e.g., reliability, a latency requirement, or a type of use cases (or services)) for at least either of the uplink data and the uplink control information. Transmitter 218 transmits at least either of the uplink data and the uplink control information based on the determined processing mode.

[Configuration of Base Station]

Figure 2:
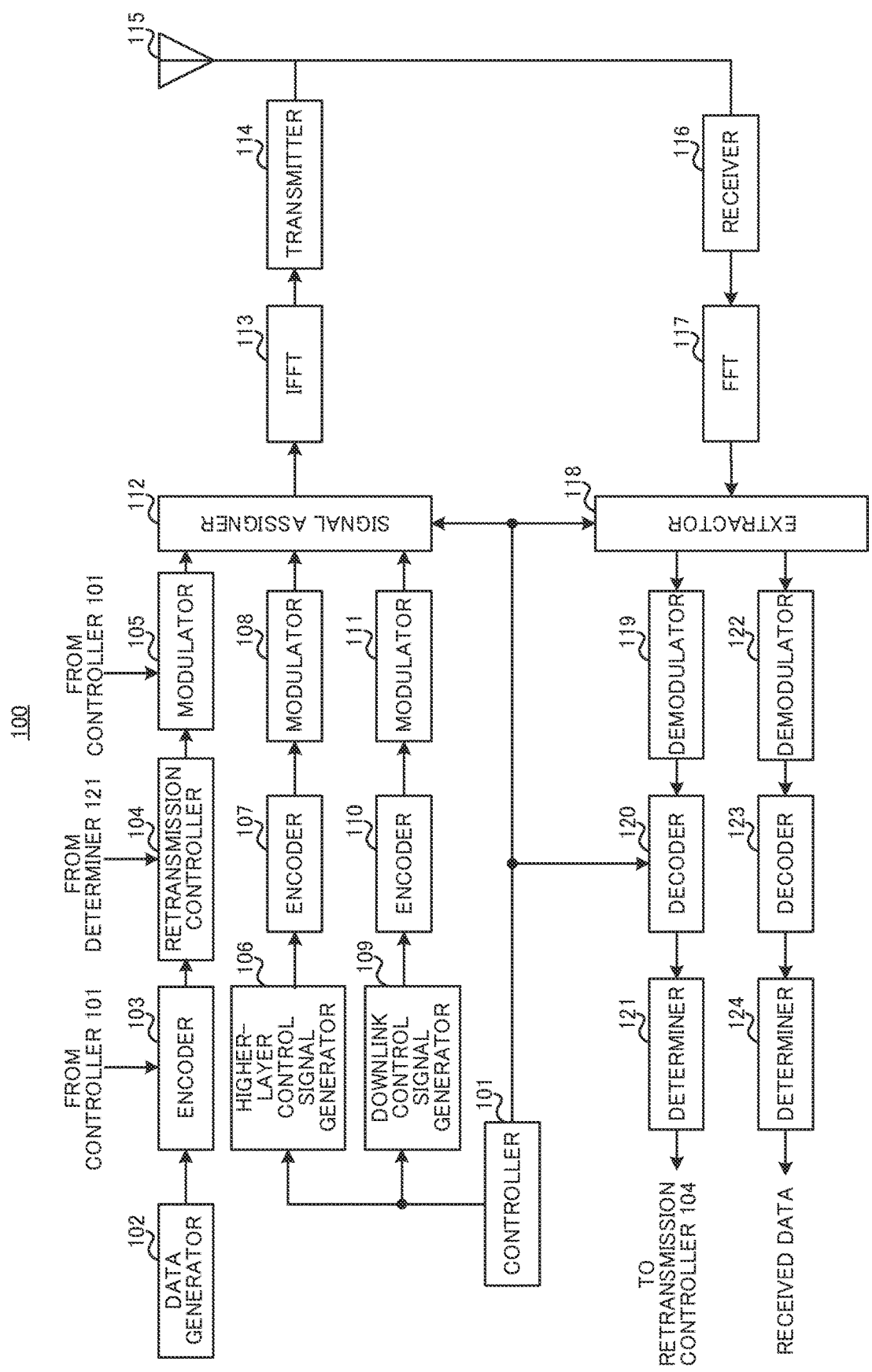
FIG. 2 is a block diagram illustrating a configuration of a base station according to Embodiment 1.

FIG. 2 is a block diagram illustrating a configuration of base station 100 according to Embodiment 1 of the present disclosure. In FIG. 2, base station 100 includes controller 101, data generator 102, encoder 103, retransmission controller 104, modulator 105, higher-layer control signal generator 106, encoder 107, modulator 108, downlink control signal generator 109, encoder 110, modulator 111, signal assigner 112, Inverse Fast Fourier Transformer (hereinafter, referred to as "IFFT") 113, transmitter 114, antenna 115, receiver 116, Fast Fourier Transformer (hereinafter, referred to as "FFT") 117, extractor 118, demodulator 119, decoder 120, determiner 121, demodulator 122, decoder 123, and determiner 124.

Controller 101 determines information on downlink data transmission for terminal 200, and outputs the determined information to encoder 103, modulator 105, and signal assigner 112. The information on downlink data transmission includes, for example, a coding and modulation scheme (e.g., MCS) for the downlink data to be transmitted in PDSCH, a radio resource for PDSCH (hereinafter, referred to as a "PDSCH resource"), or the like. Controller 101 also outputs the determined information to downlink control signal generator 109.

In addition, controller 101 determines information on reliability, a latency requirement, or a type of use cases (or services) of downlink data for terminal 200 (i.e., information on a requirement for a response signal), and outputs the determined information to higher-layer control signal generator 106 or downlink control signal generator 109. The information is indicated to terminal 200 (e.g., controller 211).

Controller 101 also determines information on reliability, a latency requirement, or a type of use cases (or services) of uplink data of terminal 200 (i.e., information on a requirement for the uplink data), and outputs the determined information to higher-layer control signal generator 106 or downlink control signal generator 109. Controller 101 also outputs the information on the transmission of UCI to higher-layer control signal generator 106 or downlink control signal generator 109. The information is indicated to terminal 200 (e.g., controller 211).

Further, controller 101 determines information on transmission of uplink control information (UCI) of terminal 200, and outputs the determined information to extractor 118 and decoder 120. The information on the transmission of UCI includes, for example, information on a parameter for calculating a resource amount for multiplexing UCI on PUSCH (e.g., $\beta_{offset}^{HARQ\text{-}ACK}$ and α in Equation 1), and the like.

In addition, controller 101 determines the radio resource allocation for a higher-layer control signal or a downlink control signal for transmitting downlink control information, and the radio resource allocation for downlink data. Controller 101 outputs the determined information to signal assigner 112.

Furthermore, controller 101 determines information on uplink data of terminal 200, and outputs the determined information to extractor 118 and downlink control signal generator 109. The information on uplink data transmission of terminal 200 includes, for example, a scheme of coding and modulation (e.g., MCS) for a data signal to be transmitted using PUSCH, a radio resource for PUSCH (hereinafter, referred to as a "PUSCH resource"), and the like.

Data generator 102 generates downlink data for terminal 200, and outputs the data to encoder 103.

Encoder 103 applies error correction encoding to the downlink data to be inputted from data generator 102 based on the information to be inputted from controller 101 (e.g., the information on a coding rate), and outputs the data signal after encoding to retransmission controller 104.

Retransmission controller 104 holds the encoded data signal to be inputted from encoder 103 in the first transmission, and also outputs the signal to modulator 105. Further, when NACK to the transmitted data signal is inputted from determiner 121, which will be described later, retransmission controller 104 outputs the corresponding holding data to modulator 105. When ACK to the transmitted data signal is inputted from determiner 121, in contrast, retransmission controller 104 deletes the corresponding holding data.

Modulator 105 modulates the data signal to be inputted from retransmission controller 104 based on the information to be inputted from controller 101 (e.g., the information on the modulation scheme), and outputs the data modulated signal to signal assigner 112.

Higher-layer control signal generator 106 generates a control information bit string (a higher-layer control signal) using the control information to be inputted from controller 101, and outputs the generated control information bit string to encoder 107.

Encoder 107 applies error correction encoding to the control information bit string to be inputted from higher-layer control signal generator 106 and outputs the control signal after encoding to modulator 108.

Modulator 108 modulates the control signal to be inputted from encoder 107, and outputs the control signal after the modulation to signal assigner 112.

Downlink control signal generator 109 generates a control information bit string (a downlink control signal; e.g., DCI) using the control information to be inputted from controller 101, and outputs the generated control information bit string to encoder 110. The control information is transmitted to a plurality of terminals in some cases, and thus downlink control signal generator 109 may generate the bit string including a terminal ID of each terminal in the control information for each terminal. Note that a scrambling sequence, which will be described later, may be used for the terminal ID.

Encoder 110 applies error correction encoding to the control information bit string to be inputted from downlink control signal generator 109, and outputs the control signal after encoding to modulator 111.

Modulator 111 modulates the control signal to be inputted from encoder 110, and outputs the control signal after the modulation to signal assigner 112.

Signal assigner 112 maps the data signal to be inputted from modulator 105, the higher-layer control signal to be inputted from modulator 108, or the downlink control signal to be inputted from modulator 111 to a radio resource based on the information indicating the radio resource to be inputted from controller 101. Signal assigner 112 outputs the downlink signal including the mapped signal to IFFT 113.

IFFT 113 applies transmission waveform generation processing such as OFDM to the signal to be inputted from signal assigner 112. IFFT 113 adds a Cyclic Prefix (CP) in the case of OFDM transmission adding a CP (not illustrated). IFFT 113 outputs the generated transmission waveform to transmitter 114.

Transmitter 114 applies Radio Frequency (RF) processing such as Digital-to-Analog (D/A) conversion and up-conversion to the signal to be inputted from IFFT 113, and transmits the radio signal to terminal 200 via antenna 115.

Receiver 116 applies RF processing such as down-conversion or Analog-to-Digital (A/D) conversion to an uplink signal waveform received from terminal 200 via antenna 115, and outputs the uplink signal waveform after the reception processing to FFT 117.

FFT 117 applies FFT processing for converting a time-domain signal into a frequency-domain signal to the uplink signal waveform to be inputted from receiver 116. FFT 117 outputs the frequency-domain signal obtained by the FFT processing to extractor 118.

Extractor 118 extracts a radio resource component on which UCI has been transmitted and a radio resource component on which uplink data has been transmitted from the signal to be inputted from FFT 117 based on the information to be inputted from controller 101 (e.g., the information on the transmission of UCI and the information on uplink data). Extractor 118 outputs the extracted radio resource component on which UCI has been transmitted to demodulator 119, and outputs the extracted radio resource component on which uplink data has been transmitted to demodulator 122.

Demodulator 119 equalizes and demodulates the radio resource component corresponding to UCI to be inputted from extractor 118, and outputs the demodulation result (the demodulation sequence) to decoder 120.

Decoder 120 performs error correction decoding on the demodulation result to be inputted from demodulator 119 based on the information on the transmission of UCI to be inputted from controller 101 (e.g., the information on encoding of UCI), and outputs the bit sequence after decoding to determiner 121.

Determiner 121 determines whether the response signal transmitted from terminal 200 indicates ACK (without error) or NACK (with error) to the transmitted data signal based on the bit sequence to be inputted from decoder 120. Determiner 121 outputs the determination result to retransmission controller 104.

Demodulator 122 equalizes and demodulates the radio resource component corresponding to uplink data to be inputted from extractor 118, and outputs the demodulation result (the demodulation sequence) to decoder 123.

Decoder 123 performs error correction decoding on the demodulation result to be inputted from demodulator 122, and outputs the bit sequence after decoding to determiner 124.

Determiner 124 applies error detection to the bit sequence to be inputted from decoder 123, and obtains received data (received UL-SCH) when no error is detected. Note that determiner 124 may generate a response signal for a retransmission request (ACK/NACK or HARQ-ACK) to terminal 200 using the error detection result, and output the signal to retransmission controller 104 (not illustrated).

[Configuration of Terminal]

Figure 3:
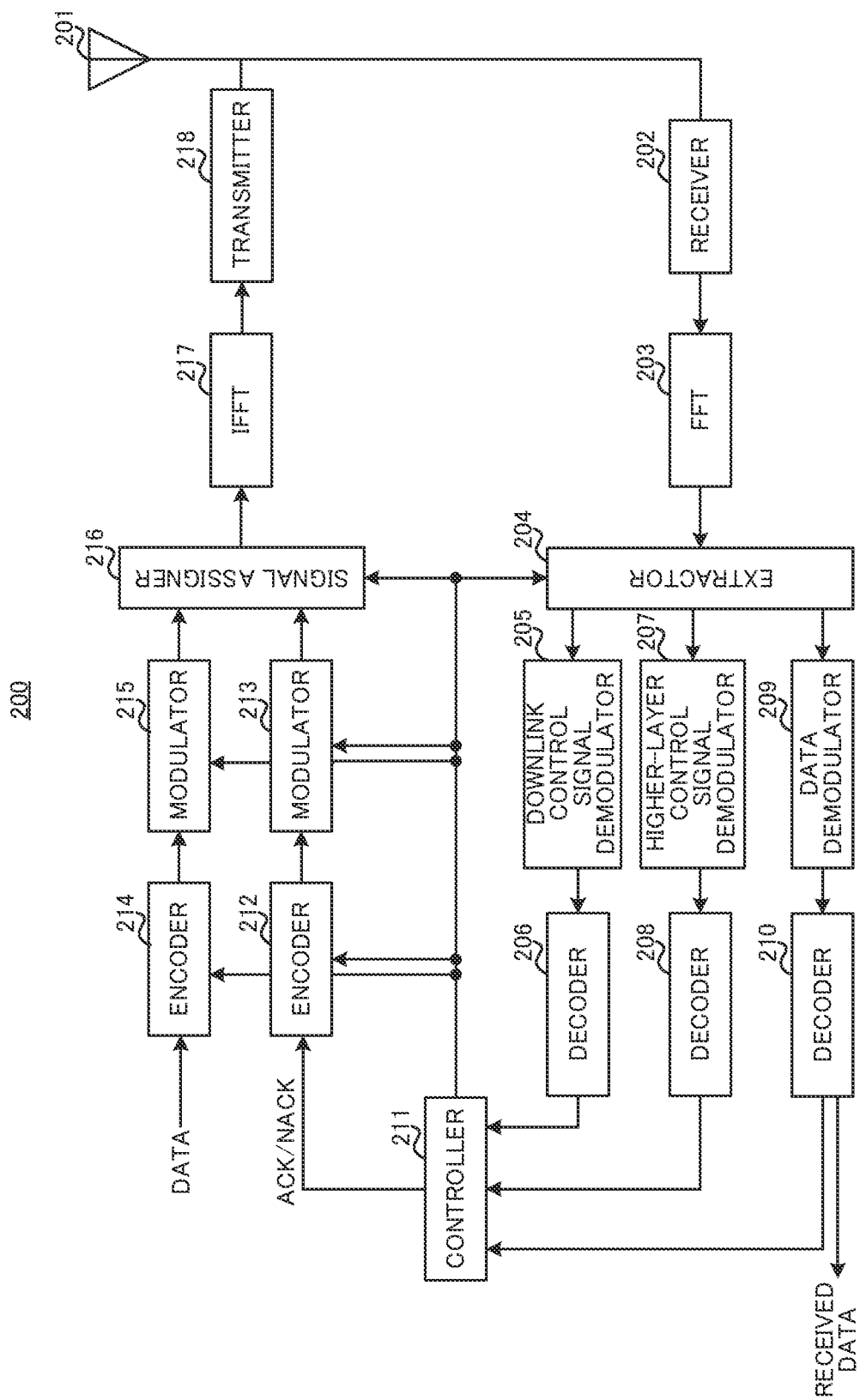
FIG. 3 is a block diagram illustrating a configuration of the terminal according to Embodiment 1.

FIG. 3 is a block diagram illustrating a configuration of terminal 200 according to Embodiment 1 of the present disclosure. In FIG. 3, terminal 200 includes antenna 201, receiver 202, FFT 203, extractor 204, downlink control signal demodulator 205, decoder 206, higher-layer control signal demodulator 207, decoder 208, data demodulator 209, decoder 210, controller 211, encoders 212 and 214, modulators 213 and 215, signal assigner 216, IFFT 217, and transmitter 218.

Receiver 202 applies RF processing such as down-conversion or Analog-to-Digital (A/D) conversion to a signal waveform of a downlink signal (a data signal or a control signal) received from base station 100 via antenna 201, and outputs the received signal (i.e., a baseband signal) obtained by the RF processing to FFT 203.

FFT 203 applies FFT processing for converting a time-domain signal into a frequency-domain signal to the signal (the time-domain signal) to be inputted from receiver 202. FFT 203 outputs the frequency-domain signal obtained by the FFT processing to extractor 204.

Extractor 204 extracts a downlink control signal (e.g., DCI), a higher-layer control signal, or downlink data from the signal to be inputted from FFT 203 based on the control information to be inputted from controller 211 (e.g., information on a radio resource for the downlink data or the control signal). Extractor 204 outputs the downlink control signal to downlink control signal demodulator 205, the higher-layer control signal to higher-layer control signal demodulator 207, and the downlink data to data demodulator 209.

Downlink control signal demodulator 205 equalizes and demodulates the downlink control signal to be inputted from extractor 204, and outputs the demodulation result to decoder 206.

Decoder 206 applies error correction decoding using the demodulation result to be inputted from downlink control signal demodulator 205, and obtains control information. Decoder 206 then outputs the obtained control information to controller 211.

Higher-layer control signal demodulator 207 equalizes and demodulates the higher-layer control signal to be inputted from extractor 204, and outputs the demodulation result to decoder 208.

Decoder 208 applies error correction decoding using the demodulation result to be inputted from higher-layer control signal demodulator 207, and obtains control information. Decoder 208 then outputs the obtained control information to controller 211.

Data demodulator 209 equalizes and demodulates the downlink data to be inputted from extractor 204, and outputs the demodulation result to decoder 210.

Decoder 210 applies error correction decoding using the demodulation result to be inputted from data demodulator 209. Decoder 210 also applies error detection to the downlink data, and outputs the error detection result to controller 211. In addition, decoder 210 outputs the downlink data determined to have no errors as a result of the error detection, as received data.

Controller 211 determines a transmission method or a parameter (e.g., MCS or a radio resource) for uplink transmission (e.g., UCI or uplink data), based on the information on PUCCH transmission and the information on PUSCH transmission of terminal 200 included in the control information to be inputted from decoder 206 or decoder 208. Controller 211 outputs the determined information to encoders 212 and 214, modulators 213 and 215, and signal assigner 216.

Further, controller 211 generates a response signal (ACK/NACK or HARQ-ACK) using the error detection result to be inputted from decoder 210, and outputs the signal to encoder 212.

Furthermore, controller 211 outputs the information on the radio resource for the downlink data or the control signal included in the control information to be inputted from decoder 206 or decoder 208, to extractor 204.

Encoder 212 applies error correction encoding to the response signal (a bit sequence) based on the information to be inputted from controller 211, and outputs the response signal (the bit sequence) after encoding to modulator 213.

Modulator 213 modulates the response signal to be inputted from encoder 212 based on the information to be inputted from controller 211, and outputs the response signal (a modulation symbol sequence) after the modulation to signal assigner 216.

Encoder 214 applies error correction encoding to the uplink data (a transmission bit sequence) based on the information to be inputted from controller 211, and outputs the uplink data (the bit sequence) after encoding to modulator 215.

Modulator 215 modulates the uplink data to be inputted from encoder 214 based on the information to be inputted from controller 211, and outputs the uplink data (a modulation symbol sequence) after the modulation to signal assigner 216.

Signal assigner 216 maps the response signal (the modulation symbol sequence) to be inputted from modulator 213 to the radio resource to be indicated by controller 211 (e.g., a PUCCH resource or a PUSCH resource). Signal assigner 216 also maps the uplink data (the modulation symbol sequence) to be inputted from modulator 215 to the PUSCH resource to be indicated by controller 211. For example, signal assigner 216 allocates the resources for both of the response signal and the uplink data with different reliability, latency requirements, or types of use cases (or services) in some cases, or drops all or punctures a part of the resource in other cases, as described later. Signal assigner 216 outputs the signal including the mapped response signal or uplink data to IFFT 217.

IFFT 217 applies transmission waveform generation processing such as OFDM to the signal to be inputted from signal assigner 216. IFFT 217 adds a Cyclic Prefix (CP) in the case of OFDM transmission adding a CP (not illustrated). Alternatively, a Discrete Fourier Transformer (DFT) may be added in a preceding stage of signal assigner 216 when IFFT 217 generates a single-carrier waveform (not illustrated). IFFT 217 outputs the generated transmission waveform to transmitter 218.

Transmitter 218 applies Radio Frequency (RF) processing such as Digital-to-Analog (D/A) conversion and up-conversion to the signal to be inputted from IFFT 217, and transmits the radio signal to base station 100 via antenna 201.

[Operations of Base Station 100 and Terminal 200]

Operations of base station 100 and terminal 200 that include above-mentioned configurations will be described in detail.

Figure 4:
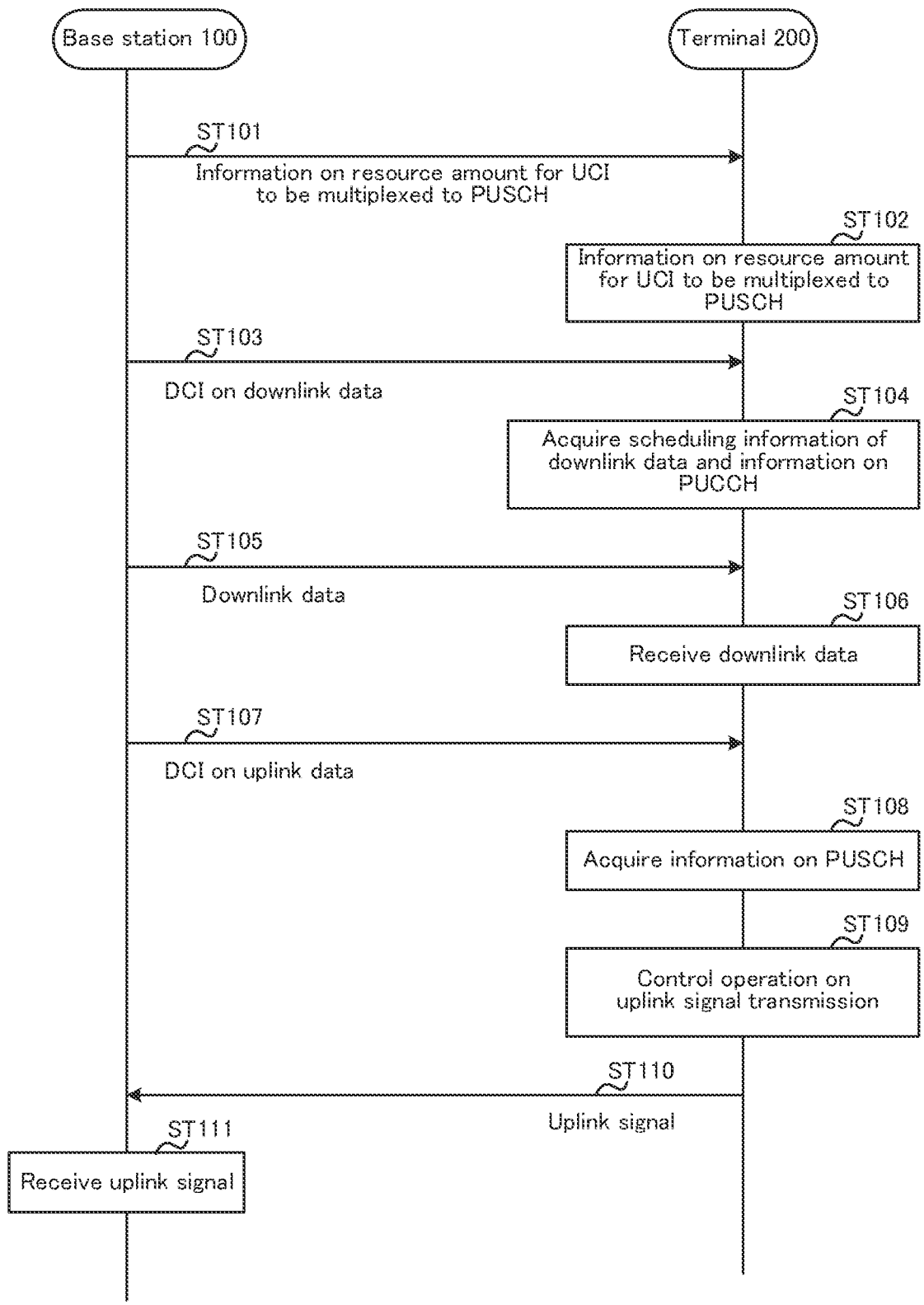
FIG. 4 is a sequence diagram illustrating processing in the base station and the terminal according to Embodiment 1.

FIG. 4 illustrates the processing in base station 100 and terminal 200 according to the present embodiment.

Base station 100 transmits information on a resource amount for UCI to be multiplexed on PUSCH to terminal 200 (ST101). Terminal 200 acquires the information on the resource amount for UCI to be multiplexed on PUSCH indicated from base station 100 (ST102). The information on the resource amount for UCI to be multiplexed on PUSCH includes, for example, a parameter controlling the resource amount for UCI to be multiplexed on PUSCH (e.g., the parameters represented by Equation 1).

Base station 100 transmits DCI including information on downlink data to terminal 200 (ST103). Terminal 200 acquires scheduling information for the downlink data or the information on PUCCH, for example, based on the DCI to be indicated from base station 100 (ST104).

Base station 100 transmits the downlink data to terminal 200 (ST105). Terminal 200 receives the downlink data (PDSCH) based on the DCI that has been indicated from base station 100, for example (ST106).

Base station 100 transmits DCI including information on uplink data to terminal 200 (ST107). Terminal 200 acquires the information on PUSCH, for example, based on the DCI to be indicated from base station 100 (ST108).

Terminal 200 controls the operation related to an uplink signal (e.g., UCI and the uplink data) according to a requirement (i.e., reliability, a latency requirement, or a type of use cases/services) for the response signal or the uplink data (ST109).

Terminal 200 transmits the uplink signal (including UCI or uplink data, for example) to base station 100 using PUCCH or PUSCH based on the determined operation (ST110). Base station 100 receives the uplink signal to be transmitted from terminal 200 (ST111).

Note that, in FIG. 4, the order of the processes from ST103 to ST106 and the processes in ST107 and ST108 may be replaced with each other.

Next, control methods of the operation related to the UCI transmission (e.g., a process in ST109 in FIG. 4) in terminal 200 will be described in detail.

The present embodiment will describe operations in terminal 200 in a case where PUCCH transmission including a response signal corresponding to URLLC and PUSCH transmission including uplink data (e.g., UL-SCH) corresponding to eMBB overlap in time with each other.

Note that the present embodiment is not limited to the case where the response signal corresponding to URLLC is included in PUCCH and the uplink data corresponding to eMBB is included in PUSCH. The signal included in PUCCH only needs to be a signal with a severe requirement such as high reliability or low latency as in URLLC, compared to the signal included in PUSCH, for example.

Terminal 200 determines a processing mode (e.g., a transmission method or a parameter) for the response signal or the uplink data according to the reliability of the response signal (e.g., a target error rate or a target BLER of the response signal). In other words, terminal 200 causes a difference in the transmission method or the parameter for the response signal or the uplink data according to the reliability of the response signal corresponding to URLLC.

Cases of the response signals with different reliability will be described as examples of causing a difference in the transmission of the response signal or the uplink data. For example, in URLLC, the transmission method or the parameter may be different between the response signal to downlink data with a high target error rate in the first data transmission (e.g., BLER=$10^{-1}$) and the response signal to downlink data with a low target error rate in the first data transmission (e.g., BLER=$10^{-5}$).

When the target error rate of the first data transmission is high, the response signal requires high reliability so that the data is surely retransmitted. When the target error rate of the first data transmission is low, in contrast, errors in the data are less likely to occur, and thus the response signal does not require very high reliability.

In this regard, when PUCCH transmission including the response signal not requiring high reliability (e.g., the response signal to downlink data with a low target error rate in the first data transmission) and PUSCH transmission including the uplink data corresponding to eMBB overlap in time with each other, terminal 200 multiplexes the response signal on PUSCH using a method or a parameter similar to the above-mentioned method or parameter described in NPLs 2 and 3, for example.

Meanwhile, when PUCCH transmission including the response signal requiring high reliability (e.g., the response signal to downlink data with a high target error rate in the first data transmission) and PUSCH transmission including the uplink data corresponding to eMBB overlap in time with each other, terminal 200 transmits the response signal in PUCCH or multiplexes the response signal on PUSCH using a method or a parameter different from the method or the parameter described in NPLs 2 and 3, for example.

Descriptions will be given of the following three methods (Options 1, 2, and 3) as exemplary methods of multiplexing the response signal on PUSCH when PUCCH transmission including the response signal requiring high reliability (e.g., the response signal with a target error rate equal to or less than a predetermined value) and PUSCH transmission including the uplink data corresponding to eMBB overlap in time with each other.

[Option 1]

In Option 1, terminal 200 drops (i.e., cancels transmission of) PUSCH (i.e., the uplink data) for eMBB, and transmits the response signal using PUCCH.

Figure 5:
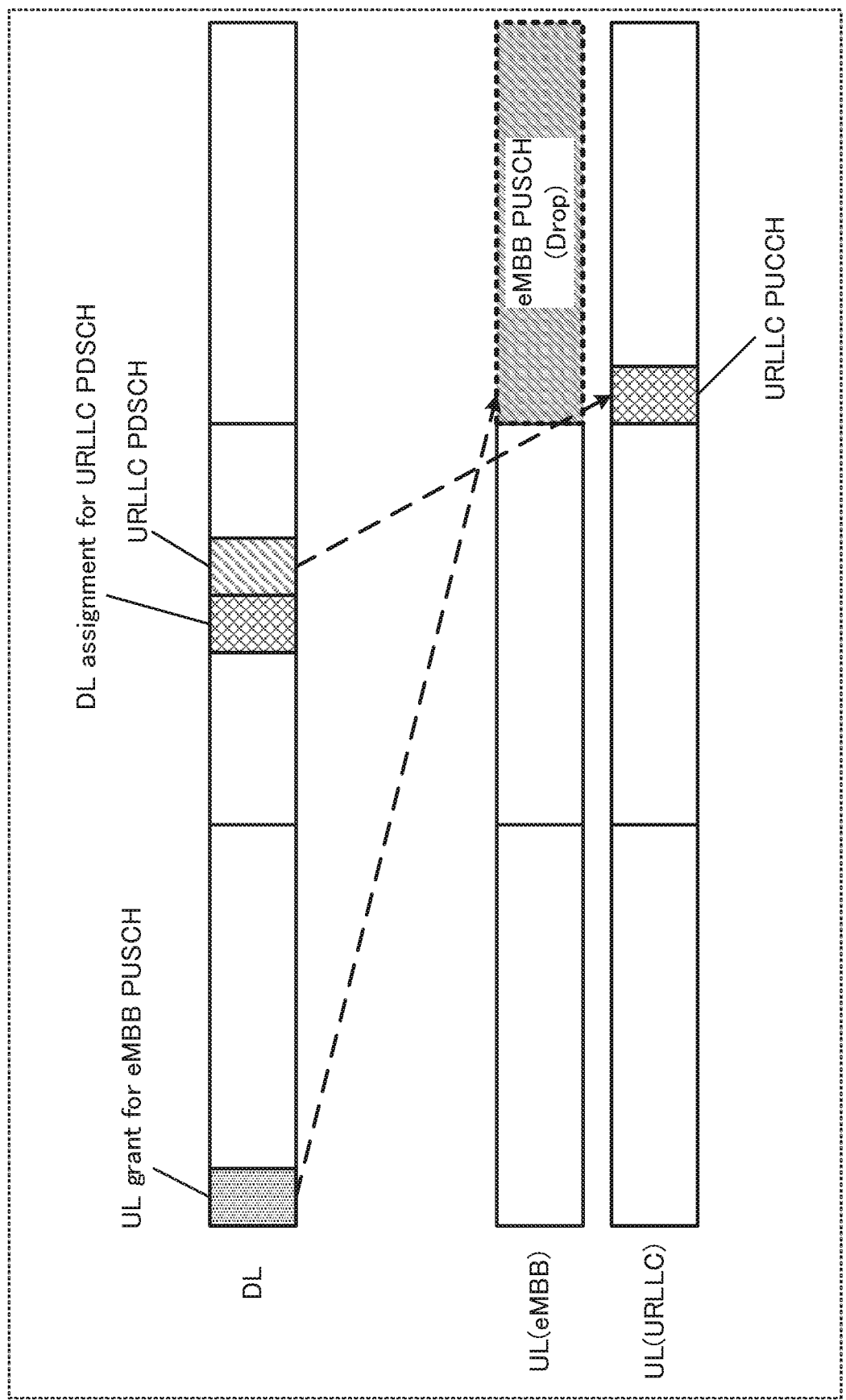
FIG. 5 illustrates an exemplary transmission processing of uplink signals according to Embodiment 1.

FIG. 5 illustrates an exemplary operation of terminal 200 in Option 1.

When PUCCH transmission including the response signal corresponding to URLLC (URLLC PUCCH) and PUSCH transmission including the uplink data corresponding to eMBB (eMBB PUSCH) overlap with each other in the same slot, terminal 200 drops eMBB PUSCH (the uplink data) and transmits URLLC PUCCH (the response signal) as illustrated in FIG. 5.

According to Option 1, the PUSCH transmission for eMBB causes no influence on the transmission of the response signal for URLLC requiring high reliability, and the quality of the response signal requiring high reliability is thus guaranteed.

In addition, terminal 200 simply needs to drop eMBB PUSCH (the uplink data) according to Option 1 and this eliminates complicated processing in terminal 200, thereby simplifying the implementation of terminal 200.

Note that terminal 200 may drop the uplink data (UL-SCH) in eMBB PUSCH, and transmit the response signal using PUSCH.

[Option 2]

In option 2, terminal 200 does not transmit (punctures) PUSCH (the uplink data) for eMBB in a duration overlapping in time with a transmission duration of PUCCH for URLLC in a transmission duration of eMBB PUSCH in the same slot. In other words, terminal 200 transmits the uplink data using PUSCH in a duration not overlapping in time with the transmission duration of PUCCH for URLLC in the transmission duration of eMBB PUSCH in the same slot.

Figure 6:
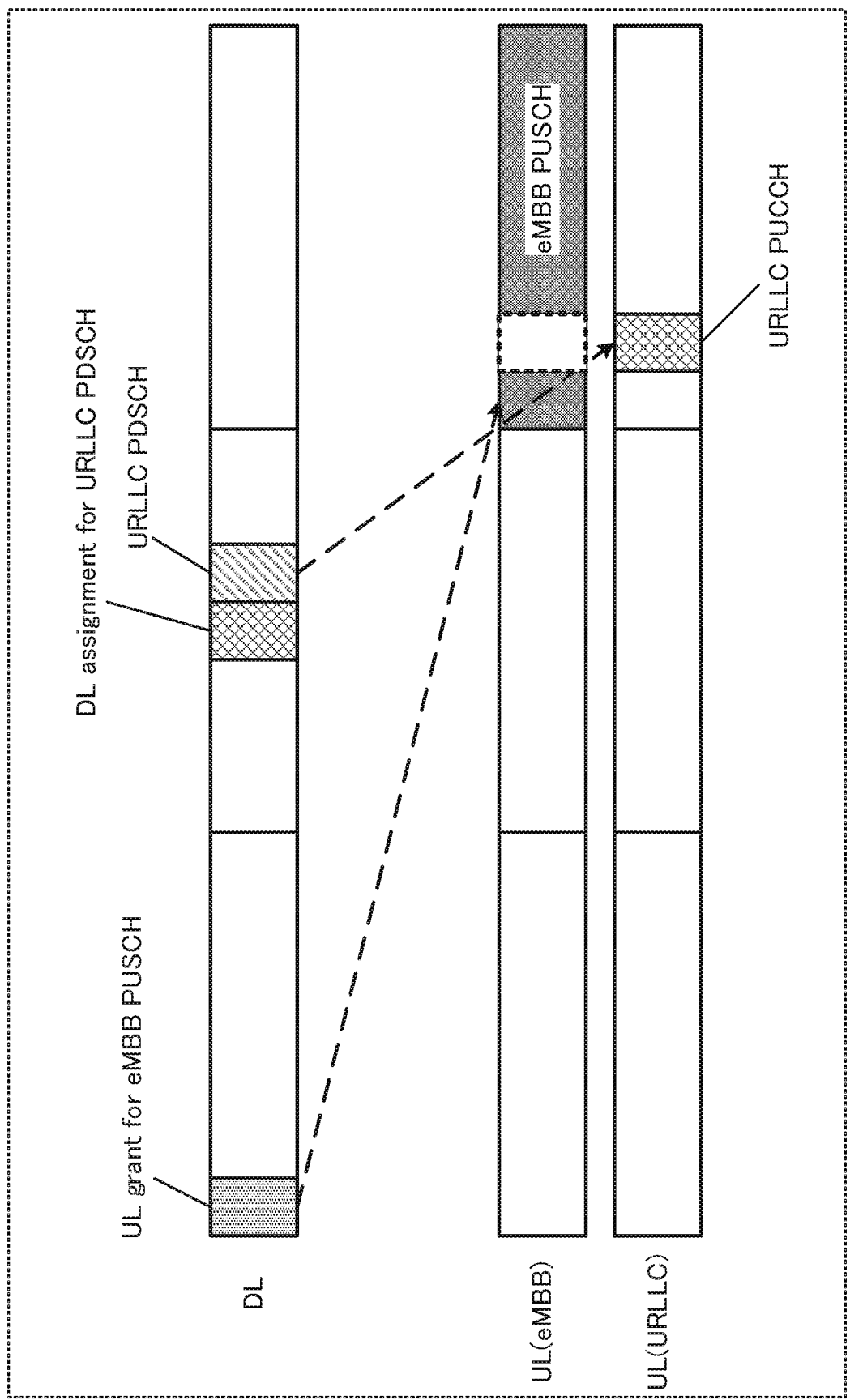
FIG. 6 illustrates another exemplary transmission processing of the uplink signals according to Embodiment 1.

FIG. 6 illustrates an exemplary operation of terminal 200 in Option 2.

When PUCCH transmission including the response signal corresponding to URLLC (URLLC PUCCH) and PUSCH transmission including the uplink data corresponding to eMBB (eMBB PUSCH) overlap with each other in the same slot, terminal 200 transmits URLLC PUCCH (e.g., the response signal) as illustrated in FIG. 6. In addition, terminal 200 punctures eMBB PUSCH (the uplink data) in the duration overlapping in time with the transmission duration of URLLC PUCCH, and transmits eMBB PUSCH (e.g., the uplink data) in durations other than the duration overlapping in time with the transmission duration of URLLC PUCCH in the transmission duration of eMBB PUSCH in the same slot, as illustrated in FIG. 6.

The transmission data amount is relatively large in the transmission corresponding to eMBB. The transmission corresponding to eMBB is thus slot-based transmission (e.g., transmission using a whole slot or most of a slot). Meanwhile, the transmission data amount is relatively small in the transmission corresponding to URLLC. Additionally, the main use case of the transmission corresponding to URLLC is assumed to be non-slot-based transmission (e.g., transmission using a few symbols) in order to achieve low latency.

Thus, the duration where the transmission corresponding to URLLC overlaps in time with the transmission corresponding to eMBB is assumed to be a few symbols in the slot, that is, a part of the transmission duration corresponding to eMBB, as illustrated in FIG. 6. Hence, terminal 200 does not drop all the transmission corresponding to eMBB at and after the transmission corresponding to URLLC, and cancels (punctures) the transmission in the duration overlapping in time with the transmission duration corresponding to URLLC in the transmission duration corresponding to eMBB, as illustrated in FIG. 6, thereby preventing the deterioration of the transmission quality of eMBB and the frequency utilization efficiency.

Note that, in Option 2, terminal 200 may puncture the uplink data and transmit the response signal in the duration where the uplink data has been punctured in eMBB PUSCH.

[Option 3]

In Option 3, terminal 200 transmits the response signal for URLLC by multiplexing the response signal on PUSCH for eMBB.

Figure 7:
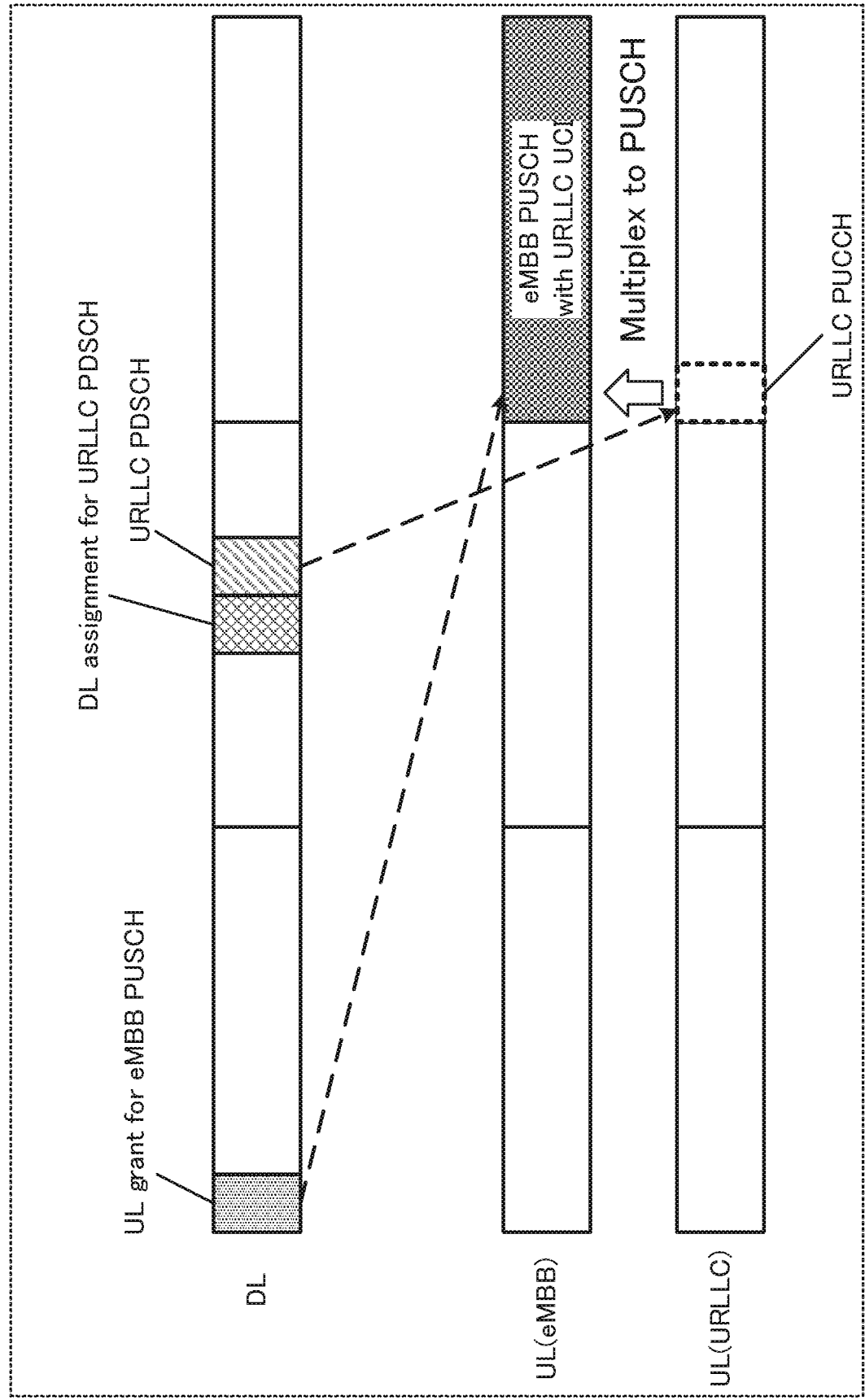
FIG. 7 illustrates still another exemplary transmission processing of the uplink signals according to Embodiment 1.

FIG. 7 illustrates an exemplary operation of terminal 200 in Option 3.

When PUCCH transmission including the response signal corresponding to URLLC (URLLC PUCCH) and PUSCH transmission including the uplink data corresponding to eMBB (eMBB PUSCH) overlap with each other in the same slot, terminal 200 multiplexes the response signal included in URLLC PUCCH (i.e., URLLC UCI) on PUSCH, as illustrated in FIG. 7. Terminal 200 then transmits the signal of eMBB PUSCH including the multiplexed response signal (URLLC UCI).

Base station 100, for example, configures a different value according to the requirement (e.g., reliability) of the response signal for at least one of the values of $\beta_{offset}^{HARQ-ACK}$ and α in Equation 1 for terminal 200.

For example, the values of $\beta_{offset}^{HARQ-ACK}$ and α according the reliability of the response signal may be configured to terminal 200 explicitly by UE-specific higher-layer signaling, or a coefficient according to the reliability of the response signal may be introduced. When the response signal with high reliability is multiplexed, for example, terminal 200 may multiply the values of $\beta_{offset}^{HARQ-ACK}$ and α in Equation 1 by the coefficient, and apply the values of $\beta_{offset}^{HARQ-ACK}$ and α multiplied by the coefficient to the calculation of the resource amount represented by Equation 1. The coefficient according to the reliability of the response signal may be a common value or different values for $\beta_{offset}^{HARQ-ACK}$ and α, for example.

This enables terminal 200 to allocate an appropriate resource for the response signal in PUSCH according to the reliability of the response signal.

In Option 3, the following methods (Options 3-1 to 3-3) may further be applied.

<Option 3-1>

The value calculated by the following Equation 2 in Equation 1 represents the resource amount required for the response signal in PUSCH, and the value calculated by the following Equation 3 in Equation 1 represents the upper limit of the resource amount to be allocated for the response signal.

(Equation 2)

$$\left\lceil \frac{(O_{ACK} + L_{ACK}) \cdot \beta_{offset}^{HARQ-ACK} \cdot \sum_{l=0}^{N_{symbol,all}^{PUSCH}-1} M_{SC}^{UCI}(l)}{\sum_{r=0}^{C_{UL-SCH}-1} K_r} \right\rceil \quad [2]$$

(Equation 3)

$$\left\lceil \alpha \cdot \sum_{l=l_0}^{N_{symbol,all}^{PUSCH}-1} M_{SC}^{UCI}(l) \right\rceil \quad [3]$$

In Option 3-1, terminal 200 multiplexes the response signal on PUSCH when the resource amount required for the response signal calculated by Equation 2 does not exceed the upper limit calculated by Equation 3. Terminal 200 thus transmits the uplink data and the response signal in PUSCH.

In contrast, when the resource amount required for the response signal calculated by Equation 2 exceeds the upper limit calculated by Equation 3, terminal 200 drops the uplink data and multiplexes the response signal on PUSCH, for example. Terminal 200 thus transmits the response signal in PUSCH without transmitting the uplink data.

Alternatively, terminal 200 may drop PUSCH (the uplink data) and transmits the response signal using PUCCH, for example, when the resource amount required for the response signal calculated by Equation 2 exceeds the upper limit calculated by Equation 3.

In Option 3-1, terminal 200 can multiplex and transmit the uplink data corresponding to eMBB and the response signal for URLLC requiring high reliability while allocating sufficient resources for the transmission of the response signal, in a range where the resource amount required for the response signal does not exceed the upper limit. Thus, Option 3-1 makes it possible to prevent the deterioration of the resource utilization efficiency for uplink while ensuring the transmission of the response signal with high reliability.

Further, in Option 3-1, terminal 200 drops the uplink data when the resource amount required for the response signal exceeds the upper limit, that is, when there are insufficient resources for the response signal. Thus, Option 3-1 makes it possible to guarantee the quality of the response signal requiring high reliability in preference to other signals.

<Option 3-2>

In Option 3-2, terminal 200 multiplexes the response signal on PUSCH when the resource amount required for the response signal calculated by Equation 2 does not exceed the upper limit calculated by Equation 3. Terminal 200 thus transmits the uplink data and the response signal in PUSCH.

In contrast, when the resource amount required for the response signal calculated by Equation 2 exceeds the upper limit calculated by Equation 3, terminal 200 multiplexes the response signal on PUSCH, and increases transmission power for PUSCH within a range where the transmission power for PUSCH does not exceed the maximum transmission power of terminal 200.

Herein, a parameter for increasing the transmission power for PUSCH may be indicated in advance from base station 100 to terminal 200 by UE-specific higher-layer signaling or UL grant (DCI) scheduling the uplink data, or specified in advance as a fixed value.

Further, when the transmission power for PUSCH exceeds the maximum transmission power of terminal 200, terminal 200 drops the uplink data, multiplexes the response signal on PUSCH, and transmits PUSCH (i.e., the response signal) with the maximum transmission power of terminal 200 in PUSCH. Alternatively, terminal 200 may drop PUSCH and transmit the response signal using PUCCH.

In Option 3-2, terminal 200 can multiplex and transmit the uplink data corresponding to eMBB and the response signal for URLLC requiring high reliability while allocating sufficient resources for the transmission of the response signal, in a range where the resource amount required for the response signal does not exceed the upper limit, as is the case with Option 3-1. Thus, Option 3-2 makes it possible to prevent the deterioration of the resource utilization efficiency for uplink while ensuring the transmission of the response signal with high reliability.

Further, in Option 3-2, terminal 200 can improve the quality of uplink transmission by increasing the transmission power for uplink signals within the range not exceeding the maximum transmission power of terminal 200, even when the resource amount required for the response signal exceeds the upper limit, that is, when there are insufficient resources for the response signal. Thus, Option 3-2 makes it possible to prevent the deterioration of the resource utilization efficiency for uplink while ensuring the transmission of the response signal with high reliability.

In addition, when the resource amount is insufficient for the response signal and the configured transmission power exceeds the maximum transmission power, terminal 200 can guarantee the quality of the response signal requiring high reliability in preference to other signals by dropping the uplink data in Option 3-2.

<Option 3-3>

In Option 3-3, terminal 200 drops the uplink data in PUSCH, and transmits the response signal by multiplexing the response signal on PUSCH when a certain parameter is indicated to terminal 200 from base station 100. Alternatively, terminal 200 may drop PUSCH (the uplink data) and transmit the response signal using PUCCH when the certain parameter is indicated from base station 100.

A parameter for calculating the resource amount required for the response signal, for example, can be used for the certain parameter to be indicated from base station 100. When the value of $\beta_{offset}^{HARQ-ACK}$ in Equation 1 is a certain value (e.g., 0), for example, terminal 200 determines to drop the uplink data or PUSCH. Note that the certain parameter to be indicated from base station 100 is not limited to the certain value of $\beta_{offset}^{HARQ-ACK}$ in Equation 1, and another parameter may be used for the certain parameter.

As described above, in Option 3-3, terminal 200 determines the transmission method for the response signal or the uplink data based on the parameter to be indicated from base station 100. Thus, terminal 200 can determine whether to drop the uplink data or PUSCH without calculating the resource amount required for the response signal and comparing the required resource amount with the upper limit as in Option 3-1 or Option 3-2, thereby simplifying the processing in terminal 200.

The exemplary methods of multiplexing the response signal on PUSCH (Options 1, 2, and 3) have been described, thus far.

As described above, in the present embodiment, when PUSCH transmission including uplink data corresponding to eMBB and PUCCH transmission including UCI (e.g., a response signal) corresponding to URLLC overlap in time with each other, terminal 200 determines a processing mode (a transmission method or a parameter) for the uplink data and the UCI according to a requirement for the UCI. Terminal 200 then transmits the UCI or both the UCI and the uplink data, based on the determined processing mode.

This enables terminal 200 to perform appropriate terminal operations and resource allocation according to the reliability of the UCI (e.g., the response signal), and to perform uplink transmission meeting the requirement for the response signal corresponding to URLLC.

Therefore, terminal 200 can appropriately transmit uplink signals according to the present embodiment.

Note that the calculation method for the resource amount required for the response signal is not limited to the formula represented by Equation 1. For example, the formula for calculating the resource amount required for the response signal only needs to include a parameter controlling a coding rate (i.e., a resource amount) of the response signal corresponding to $\beta_{offset}^{HARQ-ACK}$ in Equation 1 and a parameter controlling the upper limit of the resource amount corresponding to a in Equation 1.

Incidentally, NR supports "Grant based PUSCH transmission" and "Grant-free PUSCH transmission" (also referred to as "Configured grant PUSCH transmission") for PUSCH transmission including uplink data. In the Grant based PUSCH transmission, a radio resource for transmitting PUSCH is dynamically indicated by UL grant from a base station. In the Grant-free PUSCH transmission, a terminal transmits PUSCH, without UL grant from the base station, using a radio resource semi-statically allocated in advance at the point of data generation.

When terminal 200 transmits UCI by multiplexing the UCI on PUSCH, base station 100 is aware that UCI is multiplexed on PUSCH in the Grant based PUSCH transmission. Base station 100 can thus allocate a radio resource taking the multiplex of UCI into consideration in indicating the radio resource by a Grant (UL grant). In the Grant-free PUSCH transmission, however, base station 100 cannot allocate the radio resource taking the multiplex of UCI into consideration to terminal 200 in advance.

Thus, Option 1 (e.g., see FIG. 5), Option 2 (e.g., see FIG. 6), or Option 3 (e.g., see FIG. 7) may be switched between them and applied according to the Grant based PUSCH transmission or the Grant-free PUSCH transmission. In the Grant based PUSCH transmission, terminal 200 transmits UCI by multiplexing the UCI on PUSCH by applying Option 3, for example. Meanwhile, in the Grant-free PUSCH transmission, terminal 200 drops PUSCH and transmits the response signal using PUCCH by applying Option 1 or Option 2. This enables terminal 200 to appropriately transmit the response signal according to the Grant based PUSCH transmission or the Grant-free PUSCH transmission.

The present embodiment has described the methods for causing a difference in the transmission method or the parameter for the response signal or the uplink data according to the reliability of the response signal corresponding to URLLC, when PUCCH transmission including the response signal corresponding to URLLC and PUSCH transmission including the uplink data corresponding to eMBB overlap in time with each other.

However, the methods for causing a difference in the transmission method or the parameter for the uplink signal (e.g., the response signal or the uplink data) are not limited to the above examples. For example, the transmission method or the parameter may be made different between the response signal for URLLC and the response signal for eMBB when the response signals have different latency requirements or types of use cases (or services).

For example, when PUCCH transmission including the response signal to downlink data corresponding to eMBB and PUSCH transmission including uplink data corresponding to eMBB overlap in time with each other, terminal 200 multiplexes the response signal on PUSCH using a method or a parameter similar to the method described in NPLs 2 and 3. Meanwhile, when PUCCH transmission including the response signal to downlink data corresponding to URLLC and PUSCH transmission including uplink data corresponding to eMBB overlap in time with each other, terminal 200 may transmit the response signal using the method in Options 1, 2, or 3 described above.

Embodiment 2

A base station and a terminal according to the present embodiment have the same basic configurations as base station 100 and terminal 200 according to Embodiment 1, and thus FIGS. 2 and 3 will be used for the description.

As in Embodiment 1, the present embodiment will describe operations in terminal 200 in a case where PUCCH transmission including a response signal corresponding to URLLC and PUSCH transmission including uplink data (e.g., UL-SCH) corresponding to eMBB overlap in time with each other.

Additionally, the present embodiment will describe operations in terminal 200 in a case where PUCCH includes a plurality of response signals with different reliability, latency requirements, or types of use cases (services), i.e., requirements.

For example, in URLLC, PUCCH includes a response signal to downlink data with a high target error rate in the first data transmission (e.g., BLER=$10^{-1}$), and a response signal to downlink data with a low target error rate in the first data transmission (e.g., BLER=$10^{-5}$) in some cases. While the response signal to the downlink data with a high target error rate requires high reliability, the response signal to the downlink data with a low target error rate does not require the high reliability.

In this case, terminal 200 determines that the transmission of the response signals has a high priority since PUCCH includes the response signal requiring the high reliability. Thus, terminal 200 may apply the method in Options 1, 2, or 3 described in Embodiment 1, for example.

Further, the present embodiment causes a difference in transmission methods or parameters for the response signals in PUSCH according to the reliability, the latency requirements, or the types of use cases (services), i.e., the requirements, of the response signals, when the response signals are transmitted by being multiplexed on PUSCH (e.g., in the case of Option 3 described above).

Descriptions will be given of a case where the reliability of the response signals is different from each other as an example of causing a difference in the transmission methods or the parameters for the response signals in PUSCH. For example, the transmission method or the parameter may be made different in URLLC between the response signal to the downlink data with a high target error rate at the first data transmission (e.g., BLER=$10^{-1}$), and the response signal to the downlink data with a low target error rate in the first data transmission (e.g., BLER=$10^{-5}$).

When the response signals, which are one of UCIs, are multiplexed on PUSCH, for example, the resource amount (the number of REs) $Q'_{ACK}$ to be allocated for the response signals in PUSCH is calculated by the following Equation 4, (Equation 4)

$$Q'_{ACK} = \min\left\{ \left\lceil \frac{(O_{ACK\_total} + L_{ACK}) \cdot \beta_{offset}^{HARQ-ACK}}{\sum_{r=0}^{C_{UL-SCH}-1} K_r} \sum_{l=0}^{N_{symbol,all}^{PUSCH}-1} M_{SC}^{UCI}(l) \right\rceil, \left\lceil \alpha \cdot \sum_{l=l_0}^{N_{symbol,all}^{PUSCH}-1} M_{SC}^{UCI}(l) \right\rceil \right\} \quad [4]$$

wherein,
$L_{ACK}$: Number of CRC bits for response signal
$\beta_{offset}^{HARQ-ACK}$: Parameter for controlling coding rate of response signal
$C_{UL-SCH}$: Number of code blocks for UL-SCH transmitted in PUSCH
$K_r$: Code block size of the r-th code block
$M_{sc}^{UCI}(l)$: Number of REs available for UCI transmission in the l-th OFDM symbol
$N_{symbol,all}^{PUSCH}$: Number of OFDM symbols for PUSCH
$\alpha$: Parameter for controlling upper limit of resource amount allocated for response signal in PUSCH.

In addition, $O_{ACK\_total}$ in Equation 4 represents the total number of bits of a plurality of the response signals with different reliability, latency requirements, or types of use cases (services).

Further, the resource amount to be allocated for the response signal may be calculated by the following Equations for each of the response signals with different reliability, latency requirements, or types of use cases (services). Note that the number of the plurality of the response signals may be three or more although two response signals (ACK 1 and ACK 2) will be described as examples.

(Equation 5)

$$Q'_{ACK1} = \min\left\{ \left\lceil \frac{(O_{ACK1} + L_{ACK1}) \cdot \beta_{offset}^{HARQ-ACK}}{\sum_{r=0}^{C_{UL-SCH}-1} K_r} \sum_{l=0}^{N_{symbol,all}^{PUSCH}-1} M_{SC}^{UCI}(l) \right\rceil, \left\lceil \alpha \cdot \sum_{l=l_0}^{N_{symbol,all}^{PUSCH}-1} M_{SC}^{UCI}(l) \right\rceil \right\} \quad [5]$$

(Equation 6)

$$Q'_{ACK2} = \min\left\{ \left\lceil \frac{(O_{ACK2} + L_{ACK2}) \cdot \beta_{offset}^{HARQ-ACK}}{\sum_{r=0}^{C_{UL-SCH}-1} K_r} \sum_{l=0}^{N_{symbol,all}^{PUSCH}-1} M_{SC}^{UCI}(l) \right\rceil, \left\lceil \alpha \cdot \sum_{l=l_0}^{N_{symbol,all}^{PUSCH}-1} M_{SC}^{UCI}(l) \right\rceil - Q'_{ACK1} \right\} \quad [6]$$

In Equations 5 and 6, ACK 1 represents a response signal requiring high reliability, and ACK 2 represents a response signal not requiring high reliability. In this case, a value according to the reliability of the response signal may be configured to terminal 200 for at least one of the values of $\beta_{offset}^{HARQ-ACK}$ and $\alpha$ in Equations 5 and 6. The values of $\beta_{offset}^{HARQ-ACK}$ and $\alpha$ according the reliability of the response signal may be configured explicitly by UE-specific higher-layer signaling, or a coefficient according to the reliability of the response signal may be introduced. When the response signal with high reliability is multiplexed, for example, terminal 200 may multiply the values of $\beta_{offset}^{HARQ-ACK}$ and $\alpha$ to be applied to UCI on PUSCH by the coefficient in Equations 5 and 6, and apply the values of $\beta_{offset}^{HARQ-ACK}$ and a multiplied by the coefficient to the calculation of the resource amount represented by Equations 5 and 6. The coefficient according to the reliability of the response signal may be a common value or different values for $\beta_{offset}^{HARQ-ACK}$ and $\alpha$, for example.

This enables terminal 200 to allocate appropriate resources for the response signals in PUSCH according to the reliability of the response signals.

In Option 3, the following methods (Options 3-1 to 3-3) may further be applied, as in Embodiment 1.

<Option 3-1>

The value calculated by the following Equation 7 in Equation 4 represents the resource amount required for the plurality of the response signals in PUSCH, and the value calculated by the following Equation 8 in Equation 4 represents the upper limit of the resource amount to be allocated for the plurality of the response signals.

(Equation 7)

$$\left\lceil \frac{(O_{ACK\_total} + L_{ACK}) \cdot \beta_{offset}^{HARQ-ACK} \cdot \sum_{l=0}^{N_{symbol,all}^{PUSCH}-1} M_{SC}^{UCI}(l)}{\sum_{r=0}^{C_{UL-SCH}-1} K_r} \right\rceil \quad [7]$$

(Equation 8)

$$\left\lceil \alpha \cdot \sum_{l=l_0}^{N_{symbol,all}^{PUSCH}-1} M_{SC}^{UCI}(l) \right\rceil \quad [8]$$

In Option 3-1, terminal 200 multiplexes the response signals on PUSCH when the resource amount required for the plurality of the response signals calculated by Equation 7 does not exceed the upper limit calculated by Equation 8. Terminal 200 thus transmits the uplink data and the response signals in PUSCH.

In contrast, when the resource amount required for the plurality of the response signals calculated by Equation 7 exceeds the upper limit calculated by Equation 8, terminal 200 drops the uplink data and multiplexes the plurality of the response signals on PUSCH, for example. Terminal 200 thus transmits the response signals in PUSCH without transmitting the uplink data.

Alternatively, terminal 200 may drop PUSCH (the uplink data) and transmits the plurality of the response signals using PUCCH when the resource amount required for the plurality of the response signals calculated by Equation 7 exceeds the upper limit calculated by Equation 8.

Similarly, for the response signal requiring high reliability (ACK 1), the value calculated by the following Equation 9 in Equation 5 represents the resource amount required for the response signal requiring high reliability (ACK 1) in PUSCH, and the value calculated by the following Equation 10 in Equation 5 represents the upper limit of the resource amount to be allocated for the response signal requiring high reliability.

(Equation 9)

$$\left\lceil \frac{(O_{ACK1} + L_{ACK1}) \cdot \beta_{offset}^{HARQ-ACK} \cdot \sum_{l=0}^{N_{symbol,all}^{PUSCH}-1} M_{SC}^{UCI}(l)}{\sum_{r=0}^{C_{UL-SCH}-1} K_r} \right\rceil \quad [9]$$

(Equation 10)

$$\left\lceil \alpha \cdot \sum_{l=l_0}^{N_{symbol,all}^{PUSCH}-1} M_{SC}^{UCI}(l) \right\rceil \quad [10]$$

In Option 3-1, terminal 200 multiplexes the response signal (ACK 1) on PUSCH when the resource amount required the response signal calculated by Equation 9 does not exceed the upper limit calculated by Equation 10. Terminal 200 thus transmits the uplink data and the response signal (at least ACK 1) in PUSCH.

In contrast, when the resource amount required for the response signal calculated by Equation 9 exceeds the upper limit calculated by Equation 10, terminal 200 drops the uplink data and multiplexes the response signal on PUSCH, for example. Terminal 200 thus transmits the response signal (at least ACK 1) in PUSCH without transmitting the uplink data. Alternatively, terminal 200 may drop PUSCH and transmits the response signal (at least ACK 1) using PUCCH, for example, when the resource amount required for the response signal calculated by Equation 9 exceeds the upper limit calculated by Equation 10.

Further, for the response signal not requiring high reliability (ACK 2), for example, the value calculated by the following Equation 11 in Equation 6 represents the resource amount required for the response signal not requiring high reliability (ACK 2) in PUSCH, and the value calculated by the following Equation 12 in Equation 6 represents the upper limit of the resource amount to be allocated for the response signal not requiring high reliability.

(Equation 11)

$$\left\lceil \frac{(O_{ACK2} + L_{ACK2}) \cdot \beta_{offset}^{HARQ-ACK} \cdot \sum_{l=0}^{N_{symbol,all}^{PUSCH}-1} M_{sc}^{UCI}(l)}{\sum_{r=0}^{C_{UL-SCH}-1} K_r} \right\rceil \quad [11]$$

(Equation 12)

$$\left\lceil \alpha \cdot \sum_{l=l_0}^{N_{symbol,all}^{PUSCH}-1} M_{SC}^{UCI}(l) \right\rceil - Q'_{ACK1} \quad [12]$$

As represented by Equation 12, the upper limit of the resource amount for the response signal (ACK 2) is the remaining resource amount obtained by subtracting the resource amount $Q'_{ACK1}$ for the response signal (ACK 1) from the upper limit (the number of REs) for the plurality of the response signals. In other words, the resource amount for the response signal (ACK 2) is determined after the resource for the response signal (ACK 1) is reserved.

In Option 3-1, terminal 200 multiplexes the response signal (ACK 2) on PUSCH when the resource amount required the response signal calculated by Equation 11 does not exceed the upper limit calculated by Equation 12. Terminal 200 thus transmits the uplink data and the plurality of the response signals (ACK 1 and ACK 2) in PUSCH.

Further, when the resource amount required for the response signal calculated by Equation 11 exceeds the upper limit calculated by Equation 12, terminal 200 multiplexes each response signal on PUSCH without dropping the uplink data, for example. Terminal 200 thus transmits the uplink data and the plurality of the response signals (ACK 1 and ACK 2) in PUSCH. Although not many PUSCH resources are allocated for the response signal (ACK 2) in this case, the requirement related to the reliability for ACK 2 is possibly met because the response signal (ACK 2) does not require high reliability.

As described above, in Option 3-1, terminal 200 can multiplex and transmit the uplink data corresponding to eMBB and the plurality of the response signals while allocating sufficient resources for the transmission of the response signal for URLLC requiring high reliability, in a range where the resource amount required for the response signal does not exceed the upper limit. Thus, Option 3-1 makes it possible to prevent the deterioration of the resource utilization efficiency for uplink while ensuring the transmission of the response signal with high reliability.

Further, in Option 3-1, terminal 200 drops the uplink data when the resource required for the response signal requiring a high reliability exceeds the upper limit, that is, when there are insufficient resources for the response signal requiring a high reliability. Thus, Option 3-1 makes it possible to guarantee the quality of the response signal requiring high reliability in preference to other signals.

<Option 3-2>

In Option 3-2, terminal 200 multiplexes the plurality of the response signals on PUSCH when the resource amount required for the plurality of the response signals calculated by Equation 7 does not exceed the upper limit calculated by Equation 8. Terminal 200 thus transmits the uplink data and the plurality of the response signals in PUSCH.

In contrast, when the resource amount required for the plurality of the response signals calculated by Equation 7 exceeds the upper limit calculated by Equation 8, terminal 200 multiplexes the plurality of the response signals on PUSCH, and increases transmission power for PUSCH within a range where the transmission power for PUSCH does not exceed the maximum transmission power of terminal 200.

Herein, a parameter for increasing the transmission power for PUSCH may be indicated in advance from base station 100 to terminal 200 by UE-specific higher-layer signaling or UL grant (DCI) scheduling the uplink data, or specified in advance as a fixed value.

Further, when the transmission power for PUSCH exceeds the maximum transmission power of terminal 200, terminal 200 drops the uplink data, multiplexes the response signals on PUSCH, and transmits PUSCH (i.e., the response signals) with the maximum transmission power of terminal 200 in PUSCH. Alternatively, terminal 200 may drop PUSCH and transmit the response signals using PUCCH.

Next, descriptions will be given of a case of calculating the resource amount allocated for each of the response signals with different reliability, latency requirements, or types of use cases (services), as represented by Equations 5 and 6.

Terminal 200 multiplexes the response signal (ACK 1) on PUSCH when the resource amount required for the response signal (ACK 1) requiring high reliability calculated by Equation 9 does not exceed the upper limit calculated by Equation 10. Terminal 200 thus transmits the uplink data and the response signal (at least ACK 1) in PUSCH.

In contrast, when the resource amount required for the response signal (ACK 1) requiring high reliability calculated by Equation 9 exceeds the upper limit calculated by Equation 10, terminal 200 multiplexes the response signal (ACK 1) on PUSCH, and increases transmission power for PUSCH within a range where the transmission power for PUSCH does not exceed the maximum transmission power of terminal 200.

Herein, a parameter for increasing the transmission power for PUSCH may be indicated in advance from base station 100 to terminal 200 by UE-specific higher-layer signaling or UL grant (DCI) scheduling the uplink data, or specified in advance as a fixed value.

Further, when the transmission power for PUSCH exceeds the maximum transmission power of terminal 200, terminal 200 drops the uplink data, multiplexes the response signal (ACK 1) on PUSCH, and transmits PUSCH with the maximum transmission power of terminal 200 in PUSCH. Alternatively, terminal 200 may drop PUSCH and transmit the response signal (ACK 1) using PUCCH.

Meanwhile, terminal 200 multiplexes the response signal (ACK 2) on PUSCH when the resource amount required for the response signal (ACK 2) not requiring high reliability calculated by Equation 11 does not exceed the upper limit calculated by Equation 12. Terminal 200 thus transmits the uplink data and the plurality of response signals (e.g., ACK 1 and ACK 2) in PUSCH.

In contrast, when the resource amount required for the response signal (ACK 2) not requiring high reliability calculated by Equation 11 exceeds the upper limit calculated by Equation 12, terminal 200 multiplexes each of the response signals (ACK 1 and ACK 2) on PUSCH without increasing the transmission power for PUSCH. Although not many PUSCH resources are allocated for the response signal (ACK 2) in this case, the requirement related to the reliability for ACK 2 is possibly met because the response signal (ACK 2) does not require high reliability.

In Option 3-2, terminal 200 can multiplex and transmit the uplink data corresponding to eMBB and the response signals while allocating sufficient resources for the transmission of the response signal for URLLC requiring high reliability, as in Option 3-1, in a range where the resource amount required for the response signal requiring high reliability does not exceed the upper limit. Thus, Option 3-2 makes it possible to prevent the deterioration of the resource utilization efficiency for uplink while ensuring the transmission of the response signal with high reliability.

Further, in Option 3-2, terminal 200 can improve the quality of uplink transmission by increasing the transmission power for uplink signals within the range not exceeding the maximum transmission power of terminal 200, even when the resource amount required for the response signal requiring high reliability exceeds the upper limit, that is, when there are insufficient resources for the response signal. Thus, Option 3-2 makes it possible to prevent the deterioration of the resource utilization efficiency for uplink while ensuring the transmission of the response signal with high reliability.

In addition, when the resource amount is insufficient for the response signal requiring high reliability and the configured transmission power exceeds the maximum transmission power, terminal 200 can guarantee the quality of the response signal requiring high reliability in preference to other signals by dropping the uplink data in Option 3-2.

<Option 3-3>

In Option 3-3, terminal 200 drops the uplink data in PUSCH and multiplexes the plurality of response signals on PUSCH when a certain parameter is indicated to terminal 200 from base station 100. Alternatively, terminal 200 may drop PUSCH (the uplink data) and transmit the plurality of the response signals using PUCCH when the certain parameter is indicated from base station 100.

A parameter for calculating the resource amount required for the response signal, for example, can be used for the certain parameter to be indicated from base station 100. When the value of $\beta_{offset}^{HARQ-ACK}$ in Equations 4, 5, or 6 is a certain value (e.g., 0), for example, terminal 200 determines to drop the uplink data or PUSCH. Note that the certain parameter to be indicated from base station 100 is not limited to the certain value of $\beta_{offset}^{HARQ-ACK}$ Equations 4, 5, or 6, and another parameter may be used for the certain parameter.

As described above, in Option 3-3, terminal 200 determines the transmission method for the plurality of the response signals or the uplink data based on the parameter to be indicated from base station 100. Thus, terminal 200 can determine whether to drop the uplink data or PUSCH without calculating the resource amount required for the plurality of the response signals and comparing the required resource amount with the upper limit, thereby simplifying the processing in terminal 200.

The exemplary methods of multiplexing the response signals on PUSCH in the present embodiment (Options 3-1, 3-2, and 3-3) have been described, thus far.

As described above, in the present embodiment, when PUSCH transmission including uplink data corresponding to eMBB and PUCCH transmission including a plurality of UCIs (e.g., a plurality of response signals) corresponding to URLLC overlap in time with each other, terminal 200 determines a processing mode (a transmission method or a parameter) for the uplink data and the plurality of UCIs according to requirements for the plurality of UCIs. Terminal 200 then transmits the plurality of UCIs or both the plurality of UCIs and the uplink data, based on the determined processing mode.

This enables terminal 200 to perform appropriate terminal operations or resource allocation according to the reliability of the plurality of response signals, and to perform uplink transmission meeting the requirement for the response signal corresponding to URLLC, even when PUCCH includes the plurality of response signals with different reliability.

Therefore, terminal 200 can appropriately transmit uplink signals according to the present embodiment.

Note that the calculation method for the resource amount required for the response signal is not limited to the formula represented by Equations 4, 5, or 6. For example, the formula for calculating the resource amount required for the response signal only needs to include a parameter controlling a coding rate (i.e., a resource amount) of the response signal corresponding to $\beta_{offset}^{HARQ-ACK}$ in Equations 4, 5, or 6 and a parameter controlling the upper limit of the resource amount corresponding to a in Equations 4, 5, or 6.

Incidentally, terminal 200 may generate HARQ-ACK bits by applying different encodings or a single encoding for the response signals with different reliability, latency requirements, or types of use cases (or services) in the present embodiment.

For example, performing different encoding processes on a plurality of response signals increases the computational complexity of terminal 200, and may cause the implementation to be complicated. Performing a single encoding process by terminal 200, in contrast, enables to simplify the implementation of terminal 200, but needs a consideration of a capability related to a processing time required for receiving downlink data, decoding the downlink data, generating a response signal, and transmitting the response signal (UE capability, hereinafter referred to as "N1").

In NR, terminal 200 reports "N1" to base station 100.

Base station 100 configures a slot position of PUCCH for terminal 200 to transmit a response signal to downlink data (or the time from a slot receiving the downlink data to a slot transmitting PUCCH (e.g., the response signal): "PDSCH-to-HARQ-ACK timing"), and indicates to terminal 200. At this time, base station 100 cannot configure or indicate a value that exceeds the processing capacity (N1) of terminal 200 reported by terminal 200 (i.e., a value smaller than N1) in terms of the PDSCH-to-HARQ-ACK timing.

In the present embodiment, terminal 200 defines the capability (N1) for transmission of the response signals with different reliability, latency requirements, or types of use cases (or services) respectively, and reports to base station 100. Terminal 200 may also determine an encoding method for the response signals with different reliability, latency requirements, or types of use cases (or services) based on the value of the PDSCH-to-HARQ-ACK timing configured and indicated by base station 100 and the defined value of N1.

For example, terminal 200 has two or more capabilities (N1s) according to the reliability, the latency requirements, or the types of use cases (or services) in terms of the capability related to the processing time required for receiving downlink data, decoding the downlink data, generating a response signal, and transmitting PUCCH. Terminal 200 reports two or more capabilities (Nis) to base station 100.

As an example, terminal 200 may have two UE capabilities of N1 for eMBB (hereinafter referred to as "N1_X" or "N1_eMBB"), and N1 for URLLC (hereinafter referred to as "N1_Y" or "N1_URLLC"). For example, low latency is more likely to be required in URLLC than eMBB, and thus N1 for URLLC may be configured to be less than N1 for eMBB.

With regard to the identification of the slot position of PUCCH for transmitting response signals to the downlink data (PDSCH-to-HARQ-ACK timing), base station 100 indicates a semi-static slot position set by UE-specific higher layer signaling (e.g., RRC singling), and indicates which PDSCH-to-HARQ-ACK timing in the set is actually used by DCI for assigning the downlink data.

When the response signals corresponding to the data transmission with different reliability, latency requirements, or types of use cases (or services) are simultaneously transmitted in the same slot, terminal 200 determines the processing for the response signals based on the value of the PDSCH-to-HARQ-ACK timing for each of the response signals and the capability (N1) of terminal 200.

When the smallest value among the PDSCH-to-HARQ-ACK timing values for response signals is equal to or greater than N1_X or N1_eMBB, for example, terminal 200 performs a common encoding process on each of the response signals and generates HARQ-ACK bits.

Meanwhile, when the value of the PDSCH-to-HARQ-ACK timing for the response signal requiring high reliability or low latency or the response signal corresponding to URLLC is less than N1_X or N1_eMBB, terminal 200 cannot perform a common encoding process on the response signals. In this case, terminal 200 respectively applies different encoding methods to the response signals and generates HARQ-ACK bits.

This enables to share the encoding process as much as possible in accordance with the processing capability of terminal 200, thereby reducing the increase of the computational complexity or the complexity of the implementation of terminal 200.

Embodiment 3

A base station and a terminal according to the present embodiment have the same basic configurations as base station 100 and terminal 200 according to Embodiment 1, and thus FIGS. 2 and 3 will be used for the description.

Embodiments 1 and 2 have described the case where PUCCH transmission including a response signal corresponding to URLLC and PUSCH transmission including uplink data corresponding to eMBB overlap in time with each other. The present embodiment, in contrast, will describe operations in terminal 200 in a case where PUCCH transmission including a response signal corresponding to eMBB and PUSCH transmission including uplink data (e.g., UL-SCH) corresponding to URLLC overlap in time with each other.

Note that the present embodiment is not limited to the case where the response signal corresponding to eMBB is included in PUCCH and the uplink data corresponding to URLLC is included in PUSCH. The signal included in PUSCH only needs to be a signal with a severe requirement such as high reliability or low latency as in URLLC, compared to the signal included in PUCCH, for example.

Terminal 200 determines a processing mode (e.g., a transmission method or a parameter) for the response signal or the uplink data according to the reliability of the uplink data (e.g., a target error rate or a target BLER of the uplink data). In other words, terminal 200 causes a difference in the transmission method or the parameter for the response signal or the uplink data according to the reliability of the uplink data corresponding to URLLC.

The case where the reliability of the uplink data is different from each other will be described as an example of causing a difference in the transmission of the response signal or the uplink data. For example, in URLLC, the transmission method or the parameter may be different between the uplink data with a high target error rate (e.g., BLER=$10^{-1}$) and the uplink data with a low target error rate (e.g., BLER=$10^{-5}$).

While the uplink data with a high target error rate does not require high reliability, the uplink data with a low target error rate requires high reliability.

In this regard, when PUSCH transmission including the uplink data not requiring high reliability (e.g., the data signal with a high target error rate) and PUCCH transmission including the response signal to downlink data corresponding to eMBB overlap in time with each other, terminal 200 multiplexes the response signal on PUSCH using a method or a parameter similar to the above-mentioned method or parameter described in NPLs 2 and 3, for example.

Meanwhile, when PUSCH transmission including the uplink data requiring high reliability (e.g., the data signal with a low target error rate) and PUCCH transmission including the response signal to downlink data corresponding to eMBB overlap in time with each other, terminal 200 transmits the response signal in PUCCH or multiplexes the response signal on PUSCH using a method or a parameter different from the method or the parameter described in NPLs 2 and 3, for example.

Descriptions will be given of the following three methods (Options 1, 2, and 3) as exemplary methods of multiplexing the response signal on PUSCH when PUSCH transmission including the uplink data requiring high reliability (e.g., the uplink data with a target error rate equal to or less than a predetermined value) and PUCCH transmission including the response signal to the downlink data corresponding to eMBB overlap in time with each other.

[Option 1]

In Option 1, terminal 200 drops (i.e., cancels transmission of) PUCCH (i.e., the response signal) for eMBB, and transmits the uplink data using PUSCH.

Figure 8:
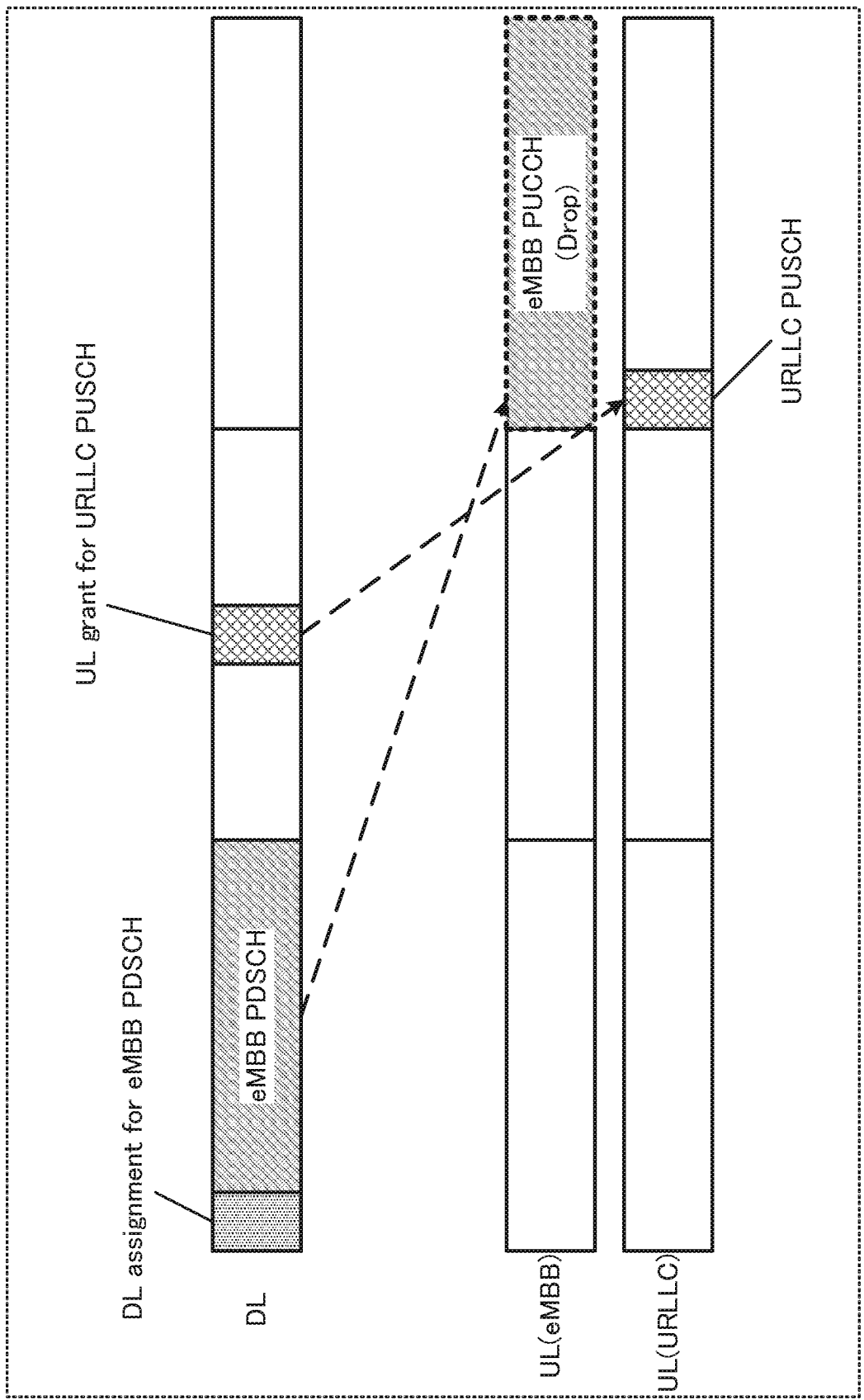
FIG. 8 illustrates an exemplary transmission processing of uplink signals according to Embodiment 3.

FIG. 8 illustrates an exemplary operation of terminal 200 in Option 1.

When PUSCH transmission including the uplink data corresponding to URLLC (URLLC PUSCH) and PUCCH transmission including the response signal to the downlink data corresponding to eMBB (eMBB PUCCH) overlap with each other in the same slot, terminal 200 drops eMBB PUCCH (the response signal) and transmits URLLC PUSCH (the uplink data) as illustrated in FIG. 8.

According to Option 1, the PUCCH transmission for eMBB causes no influence on the PUSCH transmission for URLLC requiring high reliability, and the quality of the uplink data requiring high reliability is thus guaranteed.

In addition, terminal 200 simply needs to drop eMBB PUCCH (the response signal) according to Option 1 and this eliminates complicated processing in terminal 200, thereby simplifying the implementation of terminal 200.

[Option 2]

In option 2, terminal 200 does not transmit (punctures) PUCCH (e.g., the response signal) for eMBB in a duration overlapping in time with a transmission duration of PUSCH for URLLC in a transmission duration of eMBB PUCCH in the same slot. In other words, terminal 200 transmits the response signal using PUCCH in a duration not overlapping in time with the transmission duration of PUSCH for URLLC in the transmission duration of eMBB PUCCH in the same slot.

Figure 9:
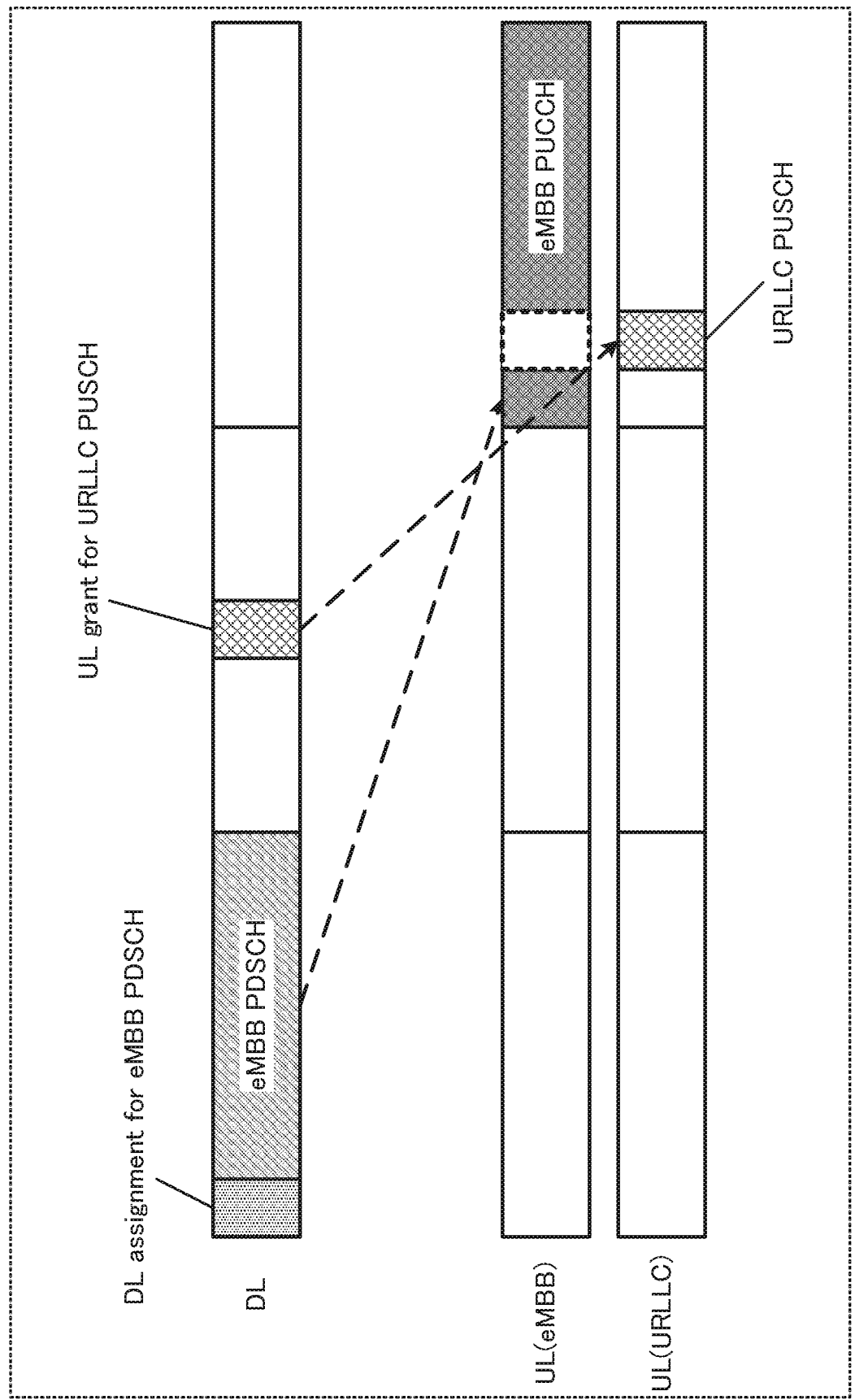
FIG. 9 illustrates another exemplary transmission processing of the uplink signals according to Embodiment 3.

FIG. 9 illustrates an exemplary operation of terminal 200 in Option 2.

When PUSCH transmission including the uplink data corresponding to URLLC (URLLC PUSCH) and PUCCH transmission including the response signal to the downlink data corresponding to eMBB (eMBB PUCCH) overlap with each other in the same slot, terminal 200 transmits URLLC PUSCH (the uplink data) as illustrated in FIG. 9. In addition, terminal 200 punctures eMBB PUCCH (e.g., the response signal) in the duration overlapping in time with the transmission duration of URLLC PUSCH, and transmits eMBB PUCCH (e.g., the response signal) in durations other than the duration overlapping in time with the transmission duration of URLLC PUSCH in the transmission duration of eMBB PUCCH in the same slot, as illustrated in FIG. 9.

The transmission data amount is relatively large in the transmission corresponding to eMBB. The transmission corresponding to eMBB is thus slot-based transmission (e.g., transmission using a whole slot or most of a slot). Meanwhile, the transmission data amount is relatively small in the transmission corresponding to URLLC. Additionally, the main use case of the transmission corresponding to URLLC is assumed to be non-slot-based transmission (e.g., transmission using a few symbols) in order to achieve low latency.

Thus, the duration where the transmission corresponding to URLLC overlaps in time with the transmission corresponding to eMBB is assumed to be a few symbols in the slot, that is, a part of the transmission duration corresponding to eMBB, as illustrated in FIG. 9. Hence, terminal 200 does not drop all the transmission corresponding to eMBB at and after the transmission corresponding to URLLC, and cancels (punctures) the transmission in the duration overlapping in time with the transmission duration corresponding to URLLC in the transmission duration corresponding to eMBB, as illustrated in FIG. 9, thereby preventing the deterioration of the transmission quality of eMBB and the frequency utilization efficiency.

[Option 3]

In Option 3, terminal 200 transmits the response signal for eMBB by multiplexing the response signal on PUSCH for URLLC.

Figure 10:
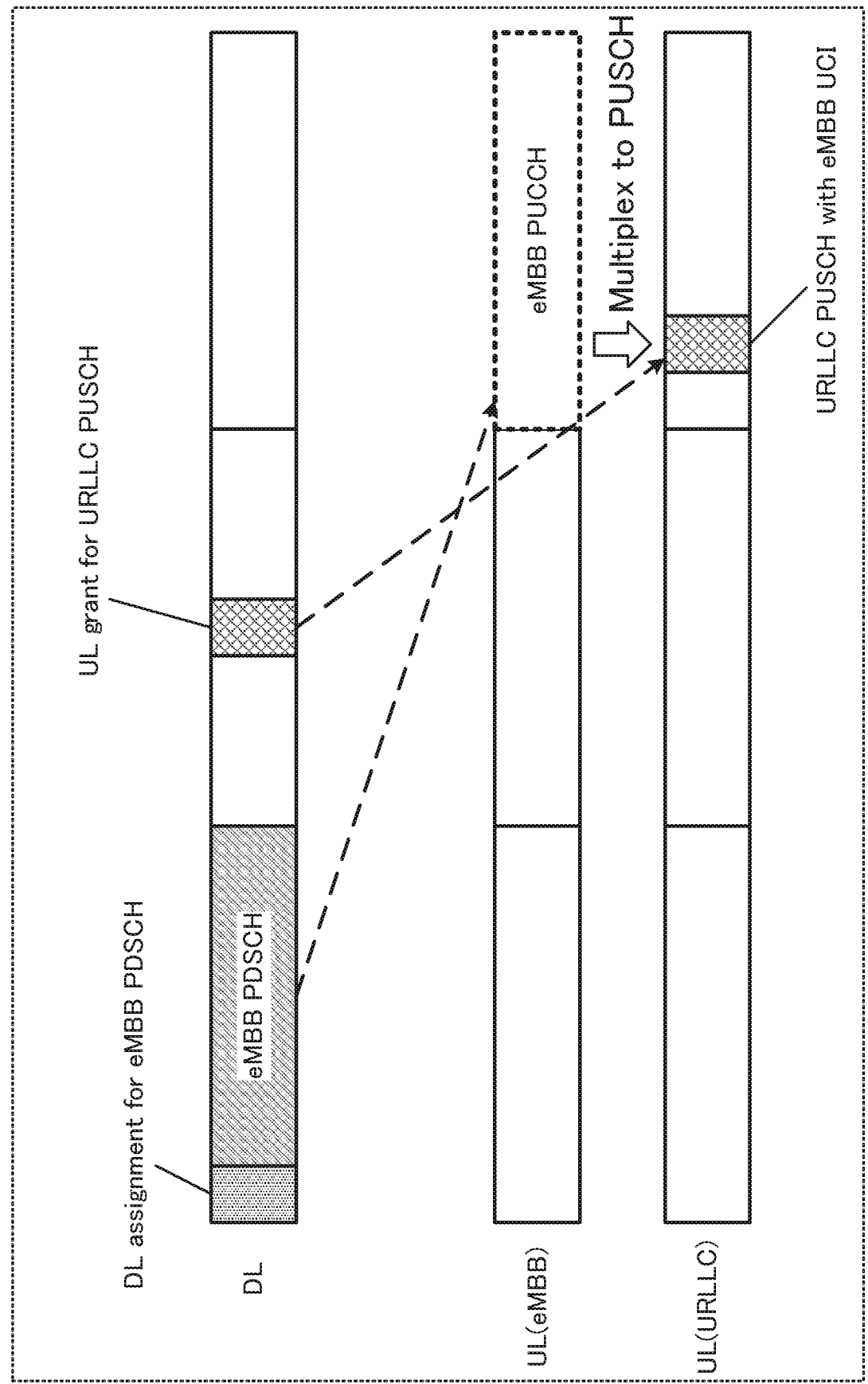
FIG. 10 illustrates still another exemplary transmission processing of the uplink signals according to Embodiment 3.

FIG. 10 illustrates an exemplary operation of terminal 200 in Option 3.

When PUCCH transmission including the response signal corresponding to eMBB (eMBB PUCCH) and PUSCH transmission including the uplink data corresponding to URLLC (URLLC PUSCH) overlap with each other in the same slot, terminal 200 multiplexes the response signal included in eMBB PUCCH (i.e., eMBB UCI) on PUSCH, as illustrated in FIG. 10. Terminal 200 then transmits the signal of URLLC PUSCH including the multiplexed response signal (eMBB UCI).

Base station 100, for example, configures a different value according to the requirement (e.g., reliability) of the uplink data (or PUSCH) for at least one of the values of $\beta_{offset}^{HARQ-ACK}$ and α in Equation 1 for terminal 200.

For example, the values of $\beta_{offset}^{HARQ-ACK}$ and α according the reliability of PUSCH may be configured to terminal 200 explicitly by UE-specific higher-layer signaling, or a coefficient according to the reliability of the uplink data may be introduced. When the response signal is multiplexed on PUSCH including the uplink data with high reliability, for example, terminal 200 may multiply the values of $\beta_{offset}^{HARQ-ACK}$ and α in Equation 1 by the coefficient, and apply the values of $\beta_{offset}^{HARQ-ACK}$ and α multiplied by the coefficient to the calculation of the resource amount represented by Equation 1. The coefficient according to the reliability of the uplink data (or PUSCH) may be a common value or different values for $\beta_{offset}^{HARQ-ACK}$ and α, for example.

This enables terminal 200 to allocate an appropriate resource for the response signal in PUSCH according to the reliability of the uplink data (or PUSCH).

The exemplary methods of multiplexing the response signal on PUSCH (Options 1, 2, and 3) have been described, thus far.

As described above, in the present embodiment, when PUSCH transmission including uplink data corresponding to URLLC and PUCCH transmission including a UCI (e.g., a response signal) corresponding to eMBB overlap in time with each other, terminal 200 determines a processing mode (a transmission method or a parameter) for the uplink data and the UCI according to a requirement for the uplink data. Terminal 200 then transmits the uplink data or both the UCI and the uplink data, based on the determined processing mode.

This enables terminal 200 to perform appropriate terminal operations and resource allocation according to the reliability of the uplink data, and to perform uplink transmission meeting the requirement for the uplink data corresponding to URLLC.

Therefore, terminal 200 can appropriately transmit uplink signals according to the present embodiment.

Note that, in Option 3, terminal 200 may drop PUCCH (e.g., the response signal), and transmit the uplink data using PUSCH when a certain parameter is indicated to terminal 200 from base station 100, as in Option 3 (Option 3-3) of Embodiment 1. A parameter for calculating the resource amount required for the response signal, for example, can be used for the certain parameter to be indicated from base station 100. When the value of $\beta_{offset}^{HARQ-ACK}$ in Equation 1 is a certain value (e.g., 0), for example, terminal 200 determines to drop PUCCH. Note that the certain parameter to be indicated from base station 100 is not limited to the certain value of $\beta_{offset}^{HARQ-ACK}$ in Equation 1, and another parameter may be used for the certain parameter.

Further, as described above, NR supports "Grant based PUSCH transmission" and "Grant-free PUSCH transmission" (also referred to as "Configured grant PUSCH transmission") for PUSCH transmission including uplink data. In the Grant based PUSCH transmission, a radio resource for transmitting PUSCH is dynamically indicated by UL grant from a base station. In the Grant-free PUSCH transmission, a terminal transmits PUSCH, without UL grant from the base station, using a radio resource semi-statically allocated in advance at the point of data generation.

When terminal 200 transmits UCI by multiplexing the UCI on PUSCH, base station 100 is aware that UCI is multiplexed on PUSCH in the Grant based PUSCH transmission. Base station 100 can thus allocate a radio resource taking the multiplex of UCI into consideration in indicating the radio resource by a Grant (UL grant). In the Grant-free PUSCH transmission, however, base station 100 cannot allocate the radio resource taking the multiplex of UCI into consideration to terminal 200 in advance.

Thus, Option 1 (e.g., see FIG. 8), Option 2 (e.g., see FIG. 9), or Option 3 (e.g., see FIG. 10) may be switched between them and applied according to the Grant based PUSCH transmission or the Grant-free PUSCH transmission. In the Grant based PUSCH transmission, terminal 200 transmits UCI by multiplexing the UCI on PUSCH by applying Option 3, for example. Meanwhile, in the Grant-free PUSCH transmission, terminal 200 drops PUCCH and transmits the uplink data using PUSCH by applying Option 1 or Option 2. This enables terminal 200 to appropriately transmit the response signal according to the Grant based PUSCH transmission or the Grant-free PUSCH transmission.

The present embodiment has described the methods for causing a difference in the transmission method or the parameter for the response signal or the uplink data according to the reliability of the uplink data corresponding to URLLC, when PUSCH transmission including the uplink data corresponding to URLLC and PUCCH transmission including the response signal to the downlink data corresponding to eMBB overlap in time with each other.

However, the methods for causing a difference in the transmission method or the parameter for the uplink signal (e.g., the response signal or the uplink data) are not limited to the above examples. For example, the transmission method or the parameter may be made different between the uplink data for URLLC and the uplink data for eMBB when the uplink data for URLLC and eMBB have different latency requirements or types of use cases (or services).

For example, when PUSCH transmission including the uplink data corresponding to eMBB (or the uplink data not requiring low latency) and PUCCH transmission including the response signal to the downlink data corresponding to eMBB overlap in time with each other, terminal 200 multiplexes the response signal on PUSCH using a method or a parameter similar to the method described in NPLs 2 and 3. Meanwhile, when PUSCH transmission including the uplink data corresponding to URLLC (or the uplink data requiring low latency) and PUCCH transmission including the response signal to the downlink data corresponding to eMBB overlap in time with each other, terminal 200 may transmit the uplink data (and the response signal) using the method in Options 1, 2, or 3 described above.

Embodiment 4

A base station and a terminal according to the present embodiment have the same basic configurations as base station 100 and terminal 200 according to Embodiment 1, and thus FIGS. 2 and 3 will be used for the description.

The present embodiment will describe operations in terminal 200 in a case where PUCCH transmission including a response signal corresponding to URLLC and PUSCH transmission including uplink data corresponding to URLLC overlap in time with each other.

Note that the present embodiment is not limited to the case where the response signal corresponding to URLLC is included in PUCCH and the uplink data corresponding to URLLC is included in PUSCH. The signals included in both PUSCH and PUCCH only need to be signals with severe requirements such as high reliability or low latency as in URLLC, for example.

Terminal 200 determines a processing mode (e.g., a transmission method or a parameter) for the response signal or the uplink data according to the reliability of the response signal (e.g., a target error rate or a target BLER of the response signal) and the reliability of the uplink data (e.g., a target error rate or a target BLER of the uplink data). In other words, terminal 200 causes a difference in the transmission method or the parameter for the response signal or the uplink data according to the reliability of the response signal and the reliability of the uplink data.

In terms of the response signal, the response signal to downlink data with a high target error rate at the first data transmission (e.g., $BLER=10^{-1}$) and the response signal to downlink data with a low target error rate in the first data transmission (e.g., $BLER=10^{-5}$) can be transmitted in URLLC, for example. While the former response signal requires high reliability, the latter response signal does not require high reliability.

Meanwhile, in terms of the uplink data, the uplink data with a high target error rate (e.g., $BLER=10^{-1}$) and the uplink data with a low target error rate (e.g., $BLER=10^{-5}$) can be transmitted in URLLC, for example. While the former uplink data does not require high reliability, the latter uplink data requires high reliability.

In this regard, the transmission method may be made different according to the combinations of the reliability of the response signal and the reliability of the uplink data described above.

First, the reliability of the uplink data is higher than the reliability of the response signal when PUCCH transmission including the response signal not requiring high reliability and PUSCH transmission including the uplink data requiring high reliability overlap in time with each other. Thus, terminal 200 transmits the uplink data or transmits the response signal and the uplink data using a method or a parameter different from the method or the parameter described in NPLs 2 and 3, based on the method described in Embodiment 3 (e.g., see FIG. 8, 9, or 10), for example.

Next, the reliability of the response signal and the reliability of the uplink data are equal when PUCCH transmission including the response signal requiring high reliability and PUSCH transmission including the uplink data requiring high reliability overlap in time with each other. Thus, terminal 200 multiplexes the response signal on PUSCH using a method or a parameter similar to the above-mentioned method or parameter described in NPLs 2 and 3, for example.

Then, the reliability of the response signal and the reliability of the uplink data are equal when PUCCH transmission including the response signal not requiring high reliability and PUSCH transmission including the uplink data not requiring high reliability overlap in time with each other. Thus, terminal 200 multiplexes the response signal on PUSCH using a method or a parameter similar to the above-mentioned method or parameter described in NPLs 2 and 3, for example.

Lastly, the reliability of the response signal is higher than the reliability of the uplink data when PUCCH transmission including the response signal requiring high reliability and PUSCH transmission including the uplink data not requiring high reliability overlap in time with each other. Thus, terminal 200 transmits the response signal or transmits the response signal and the uplink data using a method or a parameter different from the method or the parameter described in NPLs 2 and 3, based on the method described in Embodiment 1 (e.g., see FIG. 5, 6, or 7), for example.

As described above, in the present embodiment, when PUSCH transmission including uplink data corresponding to URLLC and PUCCH transmission including a UCI (e.g., a response signal) corresponding to URLLC overlap in time with each other, terminal 200 determines a processing mode (a transmission method or a parameter) for the uplink data and the UCI according to requirements for both the uplink data and the UCI. Terminal 200 then transmits at least either of the uplink data and the UCI based on the determined processing mode.

This enables terminal 200 to perform appropriate terminal operations and resource allocation according to the reliability of both the uplink data and the UCI, and to perform uplink transmission meeting the requirement for the uplink signals corresponding to URLLC.

Therefore, terminal 200 can appropriately transmit uplink signals according to the present embodiment.

Embodiment 5

A base station and a terminal according to the present embodiment have the same basic configurations as base station 100 and terminal 200 according to Embodiment 1, and thus FIGS. 2 and 3 will be used for the description.

The present embodiment will describe operations in terminal 200 in a case where PUCCH transmission with repeated transmission (Repetition) applied and PUSCH transmission including uplink data overlap in time with each other.

In Release 15 NR, PUSCH (the uplink data) is dropped when PUCCH transmission with Repetition applied and PUSCH transmission including the uplink data overlap in time with each other. Release 15 NR does not consider operations related to response signals and uplink data with different reliability, latency requirements, and types of use cases (services).

Thus, in the present embodiment, terminal 200 determines a processing mode (e.g., a transmission method or a parameter) for the repeatedly transmitted response signal or the uplink data according to the reliability of the response signal (e.g., a target error rate or a target BLER of the response signal) and the reliability of the uplink data (e.g., a target error rate or a target BLER of the uplink data). In other words, terminal 200 causes a difference in the transmission method or the parameter for the response signal or the uplink data according to the reliability of the response signal and the reliability of the uplink data.

Hereinafter, exemplary operations (Cases 1, 2, and 3) according to the present embodiment will be described.
[Case 1]

Case 1 is a case where PUCCH transmission with Repetition applied including the response signal corresponding to URLLC and PUSCH transmission including the uplink data corresponding to eMBB overlap in time with each other, as is the case with Embodiments 1 or 2.

For example, the response signal to downlink data with a high target error rate in the first data transmission (e.g., BLER=$10^{-1}$) and the response signal to downlink data with a low target error rate in the first data transmission (e.g., BLER=$10^{-5}$) can be transmitted in URLLC. The response signal to the downlink data with the high target error rate requires high reliability. Meanwhile, the response signal to the downlink data with the low target error rate does not require high reliability.

Figure 11:
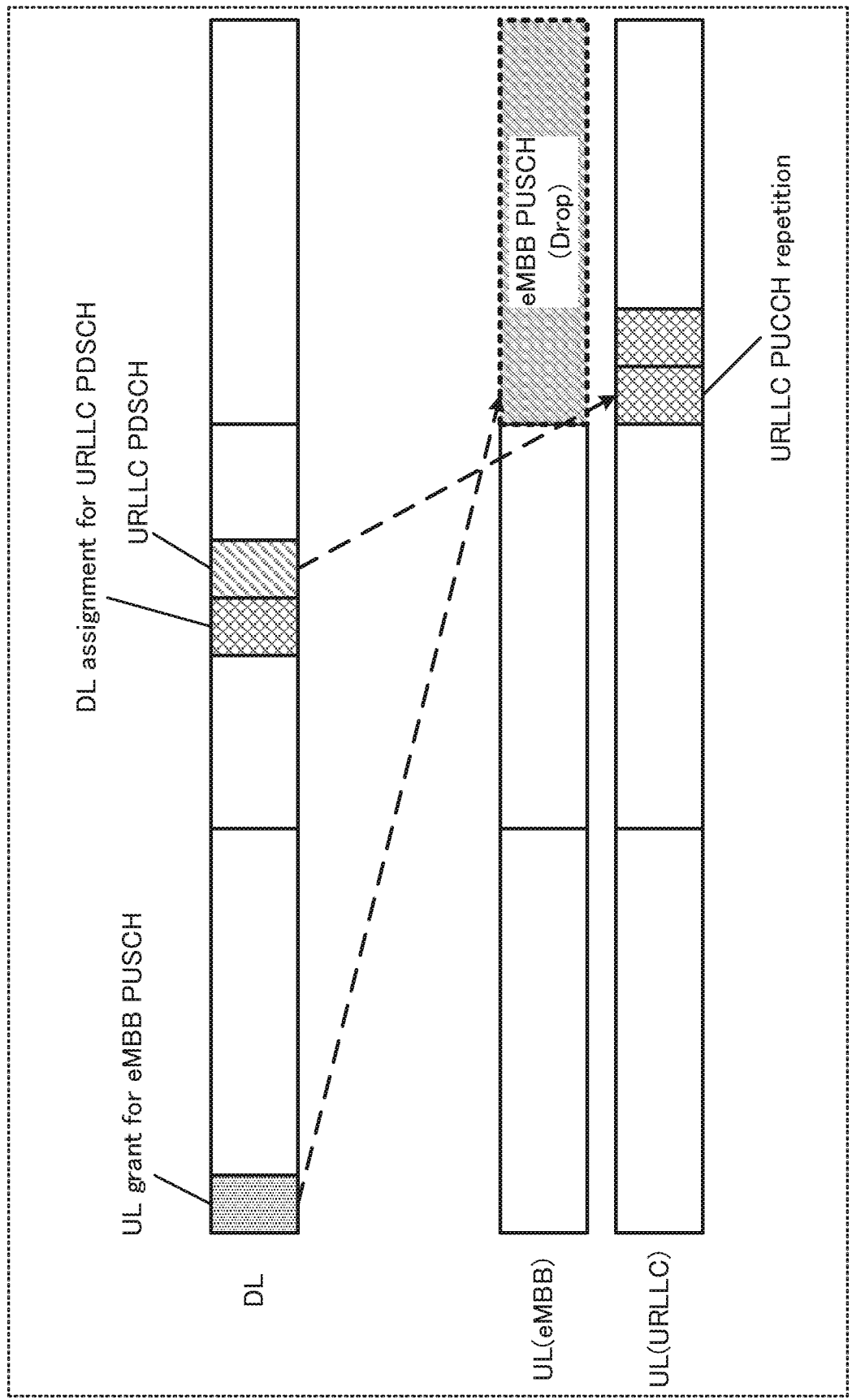
FIG. 11 illustrates an exemplary transmission processing of uplink signals according to Embodiment 5.

Thus, terminal 200 drops PUSCH (the uplink data) as in Release 15 NR, for example, when PUCCH transmission with Repetition applied including the response signal not requiring high reliability and PUSCH transmission including the uplink data corresponding to eMBB overlap in time with each other, as illustrated in FIG. 11.

Additionally, terminal 200 drops PUSCH (the uplink data) as in Release 15 NR, for example, when PUCCH transmission with Repetition applied including the response signal requiring high reliability and PUSCH transmission including the uplink data corresponding to eMBB overlap in time with each other, as illustrated in FIG. 11.

As described above, when Repetition is applied to PUCCH including the response signal corresponding to URLLC (URLLC PUCCH), terminal 200 drops eMBB PUSCH (the uplink data) overlapping in time with the URLLC PUCCH regardless of the reliability of the response signal in Case 1.

[Case 2]

Case 2 is a case where PUCCH transmission with Repetition applied including the response signal corresponding to eMBB and PUSCH transmission including the uplink data corresponding to URLLC overlap in time with each other, as is the case with Embodiment 3.

For example, the uplink data with a high target error rate (e.g., BLER=$10^{-1}$) and the uplink data with a low target error rate (e.g., BLER=$10^{-5}$) can be transmitted in URLLC. The uplink data with the high target error rate does not require high reliability. Meanwhile, the uplink data with the low target error rate requires high reliability.

Thus, terminal 200 drops PUSCH (the uplink data) as in Release 15 NR when PUSCH transmission including the uplink data not requiring high reliability and PUCCH transmission with Repetition applied including the response signal to the downlink data corresponding to eMBB overlap in time with each other.

Meanwhile, terminal 200 transmits the uplink data using a method different from Release 15 NR, or multiplexes the response signal on PUSCH using a parameter different from Release 15 NR, when PUSCH transmission including the uplink data requiring high reliability and PUCCH transmission with Repetition applied including the response signal to the downlink data corresponding to eMBB overlap in time with each other.

The following three methods (Options 1, 2, and 3) will be described as exemplary methods of multiplexing the response signal on PUSCH when PUSCH transmission including the uplink data requiring high reliability (e.g., the uplink data with a target error rate equal to or less than a predetermined value) and PUCCH transmission including the response signal to the downlink data corresponding to eMBB overlap in time with each other.

[Option 1]

In Option 1, terminal 200 drops (i.e., cancels transmission of) PUCCH (e.g., the response signal) for eMBB, and transmits the uplink data using PUSCH. At this time, terminal 200 may drop all PUCCH (e.g., the response signal) with Repetition applied, or transmit PUCCH (e.g., the response signal) in a slot not overlapping in time with PUSCH corresponding to URLLC while dropping PUCCH (e.g., the response signal) in a slot overlapping in time with PUSCH corresponding to URLLC.

Figure 12:
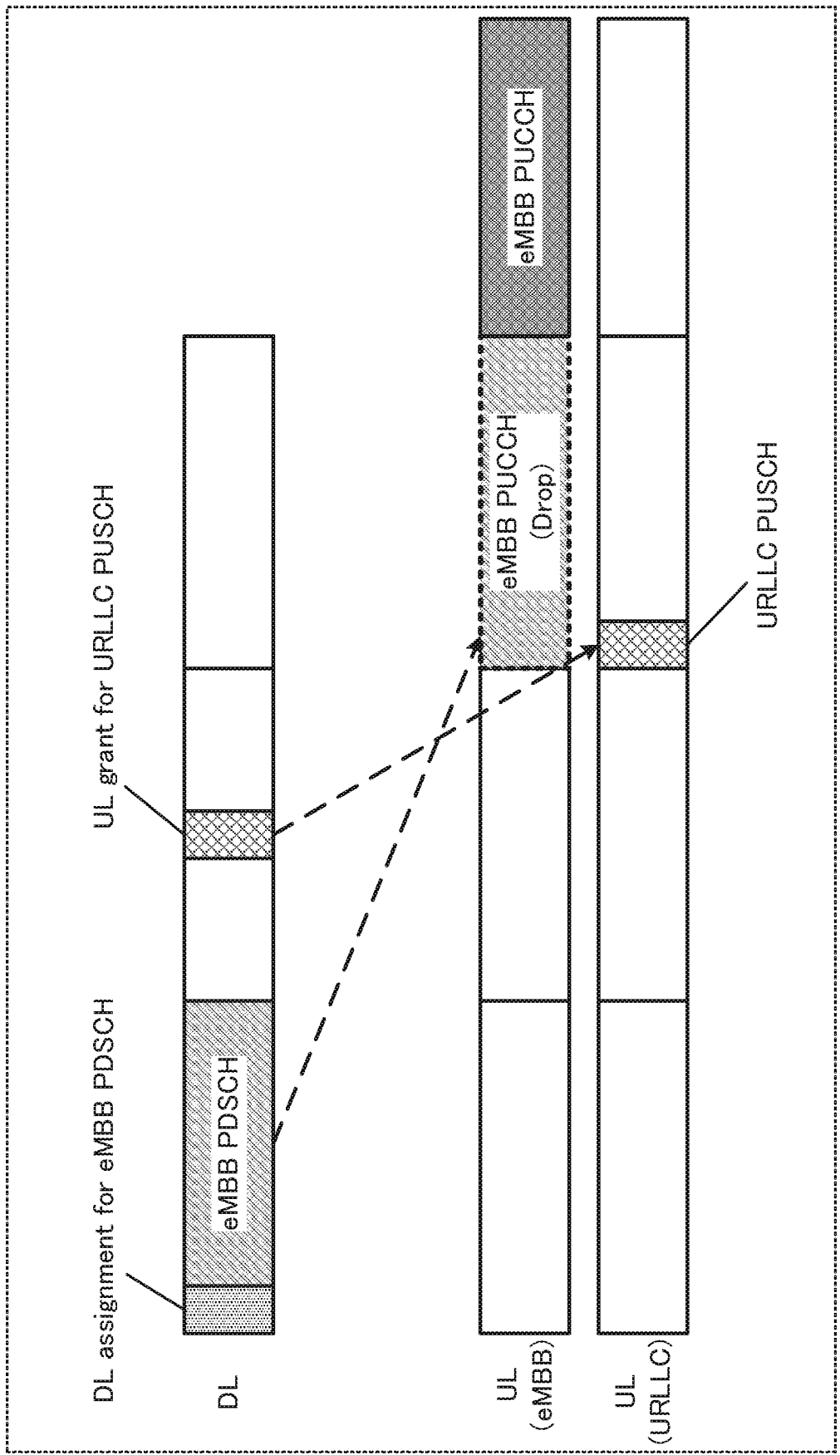
FIG. 12 illustrates another exemplary transmission processing of the uplink signals according to Embodiment 5.

FIG. 12 illustrates an exemplary operation in terminal 200 in Option 1.

When PUSCH transmission including the uplink data corresponding to URLLC (URLLC PUSCH) and PUCCH transmission including the response signal to the downlink data corresponding to eMBB (eMBB PUCCH) overlap with each other in the same slot, terminal 200 drops eMBB PUCCH (the response signal) and transmits URLLC PUSCH (the uplink data) in the slot, as illustrated in FIG. 12.

In addition, terminal 200 transmits eMBB PUCCH (the response signal) in a slot other than the slot where PUSCH transmission and PUCCH transmission overlap with each other as illustrated in FIG. 12. Terminal 200, however, may drop eMBB PUCCH (the response signal) in a slot other than the slot where PUSCH transmission and PUCCH transmission overlap with each other. Alternatively, terminal 200 may transmit eMBB PUCCH (the response signal) dropped in the slot where PUSCH transmission and PUCCH transmission overlap with each other, in a subsequent slot (i.e., may postpone the transmission of the dropped eMBB PUCCH).

According to Option 1, the PUCCH transmission for eMBB causes no influence on the PUSCH transmission for URLLC requiring high reliability, and the quality of the uplink data requiring high reliability is thus guaranteed.

In addition, terminal 200 simply needs to drop eMBB PUCCH (the response signal) according to Option 1 and this eliminates complicated processing in terminal 200, thereby simplifying the implementation of terminal 200.

[Option 2]

In Option 2, terminal 200 does not transmit (punctures) PUCCH (e.g., the response signal) for eMBB in a duration overlapping in time with a transmission duration of PUSCH for URLLC in a transmission duration of eMBB PUCCH in the same slot. In other words, terminal 200 transmits the response signal using PUCCH in a duration not overlapping in time with the transmission duration of PUSCH for URLLC in the transmission duration of eMBB PUCCH in the same slot.

Figure 13:
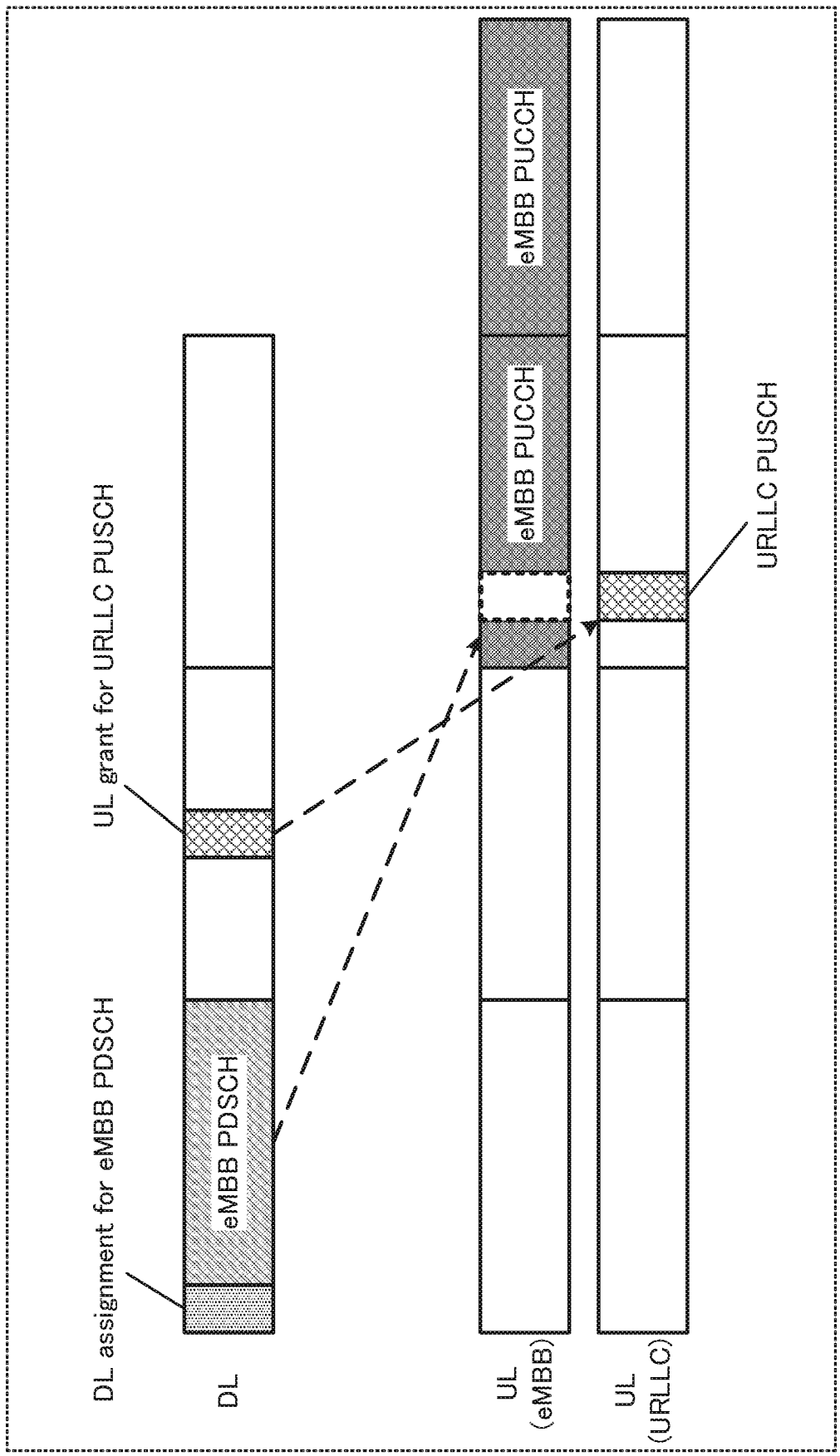
FIG. 13 illustrates still another exemplary transmission processing of the uplink signals according to Embodiment 5.

FIG. 13 illustrates an exemplary operation of terminal 200 in Option 2.

When PUSCH transmission including the uplink data corresponding to URLLC (URLLC PUSCH) and PUCCH transmission including the response signal to the downlink data corresponding to eMBB (eMBB PUCCH) overlap with each other in the same slot, terminal 200 transmits URLLC PUSCH (the uplink data) as illustrated in FIG. 13. In addition, terminal 200 punctures eMBB PUCCH (e.g., the response signal) in the duration overlapping in time with the transmission duration of URLLC PUSCH, and transmits eMBB PUCCH (e.g., the response signal) in durations other than the duration overlapping in time with the transmission duration of URLLC PUSCH in the transmission duration of eMBB PUCCH in the same slot, as illustrated in FIG. 13.

Further, terminal 200 transmits eMBB PUCCH (e.g., the response signal) in a slot where PUSCH transmission and PUCCH transmission do not overlap with each other as illustrated in FIG. 13.

The transmission data amount is relatively large in the transmission corresponding to eMBB. The transmission corresponding to eMBB is thus slot-based transmission (e.g., transmission using a whole slot or most of a slot). Meanwhile, the transmission data amount is relatively small in the transmission corresponding to URLLC. Additionally, the main use case of the transmission corresponding to URLLC is assumed to be non-slot-based transmission (e.g., transmission using a few symbols) in order to achieve low latency.

Thus, the duration where the transmission corresponding to URLLC overlaps in time with the transmission corresponding to eMBB is assumed to be a few symbols in the slot, that is, a part of the transmission duration corresponding to eMBB, as illustrated in FIG. 13. Hence, terminal 200 does not drop all the transmission corresponding to eMBB at and after the transmission corresponding to URLLC, and cancels (punctures) the transmission in the duration overlapping in time with the transmission duration corresponding to URLLC in the transmission duration corresponding to eMBB, as illustrated in FIG. 13, thereby preventing the deterioration of the transmission quality of eMBB and the frequency utilization efficiency.

[Option 3]

In Option 3, terminal 200 transmits the response signal for eMBB by multiplexing the response signal on PUSCH for URLLC. At this time, terminal 200 may drop, after multiplexing the response signal on PUSCH, all PUCCH (the response signal) with Repetition applied, or drop PUCCH (the response signal) in a slot overlapping in time with PUSCH corresponding to URLLC.

Figure 14:
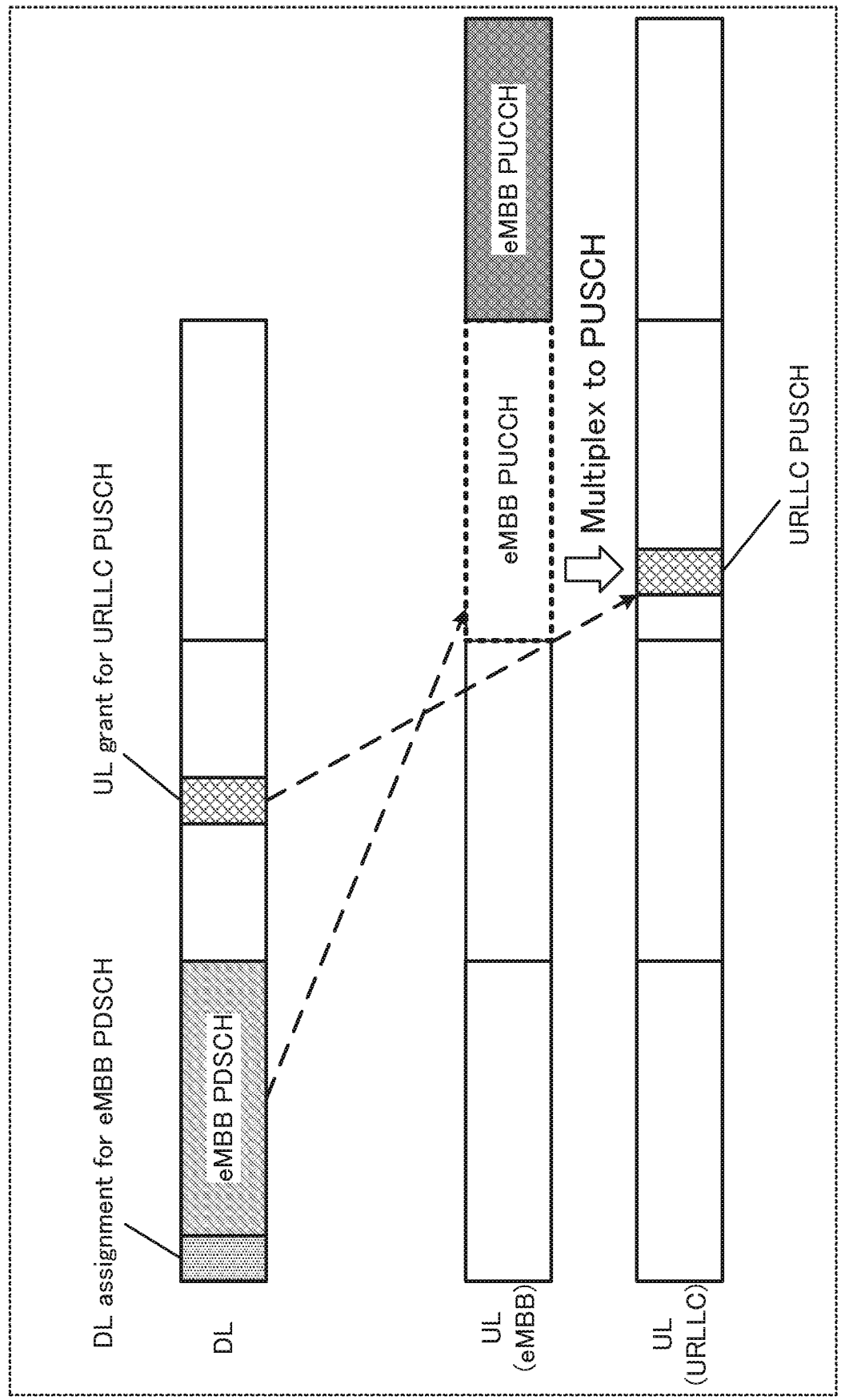
FIG. 14 illustrates still another exemplary transmission processing of the uplink signals according to Embodiment 5.

FIG. 14 illustrates an exemplary operation of terminal 200 in Option 3.

When PUCCH transmission including the response signal corresponding to eMBB (eMBB PUCCH) and PUSCH transmission including the uplink data corresponding to URLLC (URLLC PUSCH) overlap with each other in the same slot, terminal 200 multiplexes the response signal included in eMBB PUCCH (i.e., eMBB UCI) on PUSCH, as illustrated in FIG. 14. Terminal 200 then transmits the signal of URLLC PUSCH including the multiplexed response signal (eMBB UCI).

Additionally, terminal 200 transmits eMBB PUCCH (the response signal) in a slot where PUSCH transmission and PUCCH transmission do not overlap with each other as illustrated in FIG. 14.

In the present embodiment, when the response signal is transmitted by being multiplexed on PUSCH, the resource amount to be allocated for the response signal in PUSCH may be determined according to a method similar to the method in Embodiment 3.

This enables terminal 200 to allocate an appropriate resource for the response signal in PUSCH according to the reliability of the uplink data (or PUSCH).

The exemplary methods of multiplexing the response signal on PUSCH in Case 2 (Options 1, 2, and 3) have been described, thus far.

[Case 3]

Case 3 is a case where PUCCH transmission including the response signal corresponding to URLLC and PUSCH transmission including the uplink data corresponding to URLLC overlap in time with each other, as is the case with Embodiment 4.

In terms of the response signal, the response signal to downlink data with a high target error rate in the first data transmission (e.g., BLER=$10^{-1}$) and the response signal to downlink data with a low target error rate in the first data transmission (e.g., BLER=$10^{-5}$) can be transmitted in URLLC, for example. While the former response signal requires high reliability, the latter response signal does not require high reliability.

Meanwhile, in terms of the uplink data, the uplink data with a high target error rate (e.g., BLER=$10^{-1}$) and the uplink data with a low target error rate (e.g., BLER=$10^{-5}$) can be transmitted in URLLC, for example. While the former uplink data does not require high reliability, the latter uplink data requires high reliability.

In this regard, the transmission method may be made different according to the combinations of the reliability of the response signal and the reliability of the uplink data described above.

First, the reliability of the uplink data is higher than the reliability of the response signal when PUCCH transmission with Repetition applied including the response signal not requiring high reliability and PUSCH transmission including the uplink data requiring high reliability overlap in time with each other. Thus, terminal 200 transmits the uplink data using a method different from the method in Release 15 NR, or multiplexes the response signal on PUSCH using a parameter different from the parameter in Release 15 NR, based on the methods described in Case 2, for example.

Next, the reliability of the response signal and the reliability of the uplink data are equal when PUCCH transmission with Repetition applied including the response signal requiring high reliability and PUSCH transmission including the uplink data requiring high reliability overlap in time with each other. Thus, terminal 200 drops PUSCH as in Release 15 NR, for example.

Then, the reliability of the response signal and the reliability of the uplink data are equal when PUCCH transmission with Repetition applied including the response signal not requiring high reliability and PUSCH transmission including the uplink data not requiring high reliability overlap in time with each other. Thus, terminal 200 drops PUSCH as in Release 15 NR, for example.

Lastly, the reliability of the response signal is higher than the reliability of the uplink data and the reliability of the response signal should be prioritized when PUCCH transmission with Repetition applied including the response signal requiring high reliability and PUSCH transmission including the uplink data not requiring high reliability overlap in time with each other. Thus, terminal 200 drops PUSCH by the method described in Case 1, for example.

The exemplary operations according to the present embodiment (Cases 1, 2, and 3) have been described, thus far.

As described above, in the present embodiment, when PUSCH transmission including uplink data and PUCCH transmission including repeatedly transmitted a UCI (e.g., a response signal) overlap in time with each other, terminal 200 determines a processing mode (a transmission method or a parameter) for the uplink data and the UCI according to requirements for both the uplink data and the UCI. Terminal 200 then transmits at least either of the uplink data and the UCI based on the determined processing mode.

This enables terminal 200 to perform appropriate terminal operations and resource allocation according to the reliability of both the uplink data and the UCI, and to perform uplink transmission meeting the requirement for the uplink signals corresponding to URLLC.

Therefore, terminal 200 can appropriately transmit uplink signals according to the present embodiment.

Note that NR supports "Grant based PUSCH transmission" and "Grant-free PUSCH transmission" (also referred to as "Configured grant PUSCH transmission") for PUSCH transmission including uplink data. In the Grant based PUSCH transmission, a radio resource for transmitting PUSCH is dynamically indicated by UL grant from a base station. In the Grant-free PUSCH transmission, a terminal transmits PUSCH, without UL grant from the base station, using a radio resource semi-statically allocated in advance at the point of data generation.

When terminal 200 transmits UCI by multiplexing the UCI on PUSCH, base station 100 is aware that UCI is multiplexed on PUSCH in the Grant based PUSCH transmission. Base station 100 can thus allocate a radio resource taking the multiplex of UCI into consideration in indicating the radio resource by a Grant (UL grant). In the Grant-free PUSCH transmission, however, base station 100 cannot allocate the radio resource taking the multiplex of UCI into consideration to terminal 200 in advance.

Thus, Options 1, 2, or 3 may be switched between them and applied according to the Grant based PUSCH transmission or the Grant-free PUSCH transmission. In the Grant based PUSCH transmission, terminal 200 transmits UCI by multiplexing the UCI on PUSCH by applying Option 3, for example. Meanwhile, in the Grant-free PUSCH transmission, terminal 200 drops PUSCH or PUCCH by applying Option 1 or Option 2. This enables terminal 200 to appropriately transmit the response signal according to the Grant based PUSCH transmission or the Grant-free PUSCH transmission.

Each embodiment of the present disclosure has been described, thus far.

(1) In the above embodiments, transmission methods and parameters for uplink have been made different from each other according to the reliability, the latency requirements, or the types of the use cases (or services) of the response signals.

Herein, an example of causing a difference in the transmission methods and the parameters of the uplink is a case where the reliability of the response signals is different from each other. For example, in URLLC, the transmission methods and the parameters of the uplink may be made different from each other between the response signal to the downlink data with a high target error rate in the first data transmission (e.g., BLER=$10^{-1}$) and the response signal to the downlink data with a low target error rate in the first data transmission (e.g., BLER=$10^{-5}$). While the former response signal requires high reliability, the latter response signal does not require very high reliability.

Other examples of causing a difference in the transmission methods and the parameters of the uplink are cases where the latency requirements or the use cases (or services) of the response signals are different from each other. For example, the transmission methods and the parameters of the uplink may be made different from each other between the response signal corresponding to URLLC and the response signal corresponding to eMBB. While the former response signal requires high reliability or low latency, the latter response signal does not require very high reliability or very low latency. Further, as described above, URLLC may include the response signal to the downlink data with a high target error rate in the first data transmission (e.g., BLER=$10^{-1}$), and the response signal to the downlink data with a low target error rate in the first data transmission (e.g., BLER=$10^{-5}$).

Examples of causing a difference in the uplink transmission methods are not limited to the cases where reliability, latency requirements, or types of use cases (services) is different, and may include, for example, cases where parameters of physical layers are different from each other. For example, eMBB may be replaced with "slot-based transmission", and URLLC may be replaced with "non-slot-based transmission". eMBB may also be replaced with "PDSCH mapping type A" or "PUSCH mapping type A", and URLLC may also be replaced with "PDSCH mapping type B" or "PUSCH mapping type B". In addition, the present disclosure is not limited to transmissions corresponding to eMBB and URLLC, and for example, eMBB may be replaced with transmission having a long transmission duration (e.g., a slot length or a symbol length), and URLLC may be replaced with transmission having a shorter transmission duration than the transmission duration described above.

Further, in the present disclosure, the target error rate may be the target error rate of the first data transmission as described above, or may be the target error rate of retransmission when the retransmission occurs. Additionally, the target error rate may also be referred to as an "instantaneous target error rate" in the sense of the target error rate for each of the first transmission and the retransmission.

(2) The methods for determining "the reliability, the latency requirement, or the type of use cases (or services)" (i.e., the requirement) of the response signal described in the above embodiments include, for example, the following Examples 1 to 5.

Example 1: Scrambling Sequence

In Example 1, terminal 200 determines the reliability, the latency requirement, or the type of use cases (or services) of the response signal based on a UE-specific scrambling sequence to be used for DCI for scheduling the downlink data transmissions corresponding to the respective response signals.

The UE-specific scrambling sequences such as a Cell-Radio Network Temporary Identifier (C-RNTI) or a Configured Scheduling-RNTI (CS-RNTI) are used for DCI for PDSCH assuming eMBB, for example. Thus, terminal 200 determines that the reliability of the response signal is high, the latency requirement is severe, or it is URLLC when the detected scrambling sequence is different from C-RNTI or CS-RNTI. Meanwhile, terminal 200 determines that the reliability of the response signal is not high, the latency requirement is not severe, or it is eMBB when the detected scrambling sequence is C-RNTI or CS-RNTI.

For example, controller 101 (see FIG. 2, for example) of base station 100 determines information on the reliability, the latency requirement, or the type of use cases (or services) of the downlink data for terminal 200. The determined information is outputted to downlink control signal generator 109 of base station 100. Downlink control signal generator 109 generates a bit string of DCI using a scrambling sequence according to the reliability, the latency requirement, or the type of use cases (or services) of the downlink data for terminal 200, as described above.

Meanwhile, decoder 206 (see FIG. 3, for example) of terminal 200 outputs the detected scrambling sequence to controller 211. Controller 211 determines the information on the reliability, the latency requirement, or the type of use cases (or services) of the downlink data based on the acquired scrambling sequence.

Example 2: MCS Table

In Example 2, terminal 200 determines the reliability, the latency requirement, or the type of use cases (or services) of the response signal based on an MCS table to be used for scheduling the downlink data transmissions corresponding to the respective response signals.

In Release 15 NR, for example, which of the MCS tables to be used can be configured, the MCS table for achieving the target BLER=$10^{-1}$ or the MCS table for achieving the target BLER=$10^{-5}$.

For example, terminal 200 determines that the response signal requires high reliability when the configured MCS table in URLLC is the MCS table for achieving the target BLER=$10^{-1}$. In contrast, terminal 200 determines that the response signal does not require high reliability when the configured MCS table in URLLC is the MCS table for achieving the target BLER=$10^{-5}$.

For example, controller 101 of base station 100 determines information on the reliability, the latency requirement, or the type of use cases (or services) of the downlink data for terminal 200. The determined information is outputted to downlink control signal generator 109, encoder 103, and modulator 105 of base station 100. Downlink control signal generator 109 includes information on the MCS table to be used for downlink data transmission in a bit string of DCI. Further, encoder 103 and modulator 105 encode and modulate the downlink data using the information on the MCS table to be inputted from controller 101.

Meanwhile, decoder 206 of terminal 200 decodes DCI, and outputs the decoding result to controller 211. Controller 211 determines the information on the reliability, the latency requirement, or the type of use cases (or services) of the downlink data, based on the information on the MCS table to be acquired from DCI.

Example 3: PDSCH-to-HARQ-ACK Timing or Number of Transmission Symbols for PDSCH

In Example 3, terminal 200 determines the reliability, the latency requirement, or the type of use cases (or services) of the response signal based on a "PDSCH-to-HARQ-ACK timing" or the number of transmission symbols of PDSCH, indicated by DCI for scheduling the downlink data transmissions corresponding to the respective response signals.

For example, terminal 200 determines that the latency requirement of the response signal is severe or the response signal is for URLLC when the PDSCH-to-HARQ-ACK timing is equal to or less than a predetermined value, or the number of transmission symbols of PDSCH is equal to or less than a predetermined number of symbols. In contrast, terminal 200 determines that the latency requirement of the response signal is not severe or the response signal is for eMBB when the PDSCH-to-HARQ-ACK timing is greater than the predetermined value, or the number of transmission symbols of PDSCH is more than the predetermined number of symbols.

Note that the predetermined value or the predetermined number of symbols may be a value determined in advance in a standard, or a value configurable for terminal 200 by base station 100 using higher layer signaling.

For example, controller 101 of base station 100 determines the PDSCH-to-HARQ-ACK timing indicating a slot position transmitting the response signal to the downlink data for terminal 200 or the number of transmission symbols of PDSCH. The determined information is outputted to downlink control signal generator 109, signal assigner 112, and extractor 118 of base station 100. Downlink control signal generator 109 includes information on the PDSCH-to-HARQ-ACK timing or the number of transmission symbols of PDSCH in a bit string of DCI.

Meanwhile, decoder 206 of terminal 200 decodes DCI, and outputs the decoding result to controller 211. Controller 211 determines the information on the reliability, the latency requirement, or the type of use cases (or services) of the downlink data based on the information on the PDSCH-to-HARQ-ACK timing or the number of transmission symbols of PDSCH to be acquired from DCI.

Example 4: CQI Table

In Example 4, terminal 200 determines the reliability, the latency requirement, or the type of use cases (or services) of the response signal based on a CQI table configured for the downlink data transmissions corresponding to the respective response signals.

In Release 15 NR, for example, which of the CQI tables to be used can be configured, the CQI table for achieving the target BLER=$10^{-1}$ or the CQI table for achieving the target BLER=$10^{-5}$.

For example, terminal 200 determines that the response signal requires high reliability when the configured CQI table in URLLC is the CQI table for achieving the target BLER=$10^{-1}$. In contrast, terminal 200 determines that the response signal does not require high reliability when the configured CQI table in URLLC is the CQI table for achieving the target BLER=$10^{-5}$.

For example, controller 101 of base station 100 determines information on the CQI table to be configured for downlink data transmission for terminal 200. The determined information is outputted to higher-layer control signal generator 106. Higher-layer control signal generator 106 includes the information on the CQI table in a higher-layer control signal.

Meanwhile, decoder 208 of terminal 200 decodes the higher-layer control signal, and outputs the decoding result to controller 211. Controller 211 determines the information on the reliability, the latency requirement, or the type of use cases (or services) of the downlink data, based on the information on the CQI table to be acquired from the higher-layer control signal.

Example 5: Explicit Indication by DCI

In Example 5, terminal 200 determines the reliability, the latency requirement, or the type of use cases (or services) of the response signal by explicit indication provided by several bits in DCI for scheduling the downlink data transmissions corresponding to the respective response signals.

The explicit indication may be information on the reliability, the latency requirement, or the type of use cases (services) of the response signal itself, and may also be information on the reliability (e.g., the target BLER), the latency requirement, or the type of use cases (services) of PDSCH.

For example, controller 101 of base station 100 determines information on the reliability, the latency requirement, or the type of use cases (or services) of the response signal to the downlink data for terminal 200. The determined information is outputted to downlink control signal generator 109. Downlink control signal generator 109 includes the information on the reliability, the latency requirement, or the type of use cases (or services) of ACK/NACK in a bit string of DCI.

Meanwhile, decoder 206 of terminal 200 decodes DCI, and outputs the decoding result to controller 211. Controller 211 acquires the information on the reliability, the latency requirement, or the type of use cases (or services) of the response signal from DCI.

The methods for determining "the reliability, the latency requirement, or the type of use cases (or services) of the response signal" have been described, thus far. Note that the methods of determining "the reliability, the latency requirement, or the type of use cases (or services) of the response signal" is not limited to Examples 1 to 5 described above, and the determination method may also be based on other information related to the requirements.

(3) Further, the above embodiments have described the case where the response signal to the downlink data transmission is transmitted using PUCCH or PUSCH as an example. The UCI to be transmitted using PUCCH or PUSCH, however, is not limited to response signals in the present disclosure. For example, the "response signal (ACK/NACK or HARQ-ACK)" may be replaced with channel state information (CSI), or UCI including a response signal and CSI in the above embodiments.

(4) Further, the present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. Some non-limiting examples of such a communication apparatus include a phone (e.g, cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g, an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples."

A terminal according to the present disclosure includes: circuitry, which, in operation, determines a processing mode for uplink data and uplink control information according to a requirement for at least either of the uplink data and the uplink control information when transmission of an uplink data channel including the uplink data and transmission of an uplink control channel including the uplink control information overlap in time with each other; and a transmitter, which in operation, transmits at least either of the uplink data and the uplink control information based on the determined processing mode.

In the terminal according to an embodiment of the present disclosure, the requirement includes a target error rate, and the circuitry determines the processing mode for the uplink data and the uplink control information in accordance with the target error rate of the uplink control information.

In the terminal according to an embodiment of the present disclosure, the transmitter drops the uplink data and transmits the uplink control information using the uplink control channel when the target error rate of the uplink control information is equal to or less than a predetermined value.

In the terminal according to an embodiment of the present disclosure, when the target error rate of the uplink control information is equal to or less than a predetermined value, the transmitter punctures the uplink data in a duration overlapping with a transmission duration of the uplink control channel in a transmission duration of the uplink data channel, transmits the uplink data in a duration other than the duration overlapping with the transmission duration of the uplink control channel, and transmits the uplink control information using the uplink control channel.

In the terminal according to an embodiment of the present disclosure, the transmitter multiplexes the uplink control information on the uplink data channel to transmit the multiplexed uplink control information on the uplink data channel when the target error rate of the uplink control information is equal to or less than a predetermined value.

In the terminal according to an embodiment of the present disclosure, the uplink control information is a response signal to downlink data, and at least one of a parameter for controlling a resource amount required for the response signal in the uplink data channel and a parameter for controlling an upper limit of the resource amount is configured according to the requirement of the response signal.

In the terminal according to an embodiment of the present disclosure, the uplink control information is a response signal to downlink data, and the transmitter drops the uplink data and transmits the response signal in the uplink data channel when a resource amount required for the response signal in the uplink data channel exceeds an upper limit of the resource amount.

In the terminal according to an embodiment of the present disclosure, the uplink control information is a response signal to downlink data, and the circuitry increases transmission power for the uplink data channel when a resource amount required for the response signal in the uplink data channel exceeds an upper limit of the resource amount. In the terminal according to an embodiment of the present disclosure, the transmitter drops the uplink data and transmits the response signal with maximum transmission power of the terminal in the uplink data channel when the transmission power for the uplink data channel exceeds the maximum transmission power.

In the terminal according to an embodiment of the present disclosure, the transmitter drops the uplink data and transmits the uplink control information in the uplink data channel when a certain parameter is indicated from a base station to the terminal.

In the terminal according to an embodiment of the present disclosure, the circuitry determines the processing mode for the uplink control information in the uplink data channel according to the requirement for the uplink control information.

In the terminal according to an embodiment of the present disclosure, transmission of the uplink data channel includes transmission using a resource dynamically indicated from a base station to the terminal, and transmission using a resource semi-statically allocated to the terminal.

In the terminal according to an embodiment of the present disclosure, the requirement includes a target error rate, and the circuitry determines the processing mode for the uplink data and the uplink control information according to the target error rate of the uplink data.

In the terminal according to an embodiment of the present disclosure, the transmitter drops the uplink control information in the uplink control channel and transmits the uplink data using the uplink data channel, when the target error rate of the uplink data is equal to or less than a predetermined value.

In the terminal according to an embodiment of the present disclosure, when the target error rate of the uplink data is equal to or less than a predetermined value, the transmitter punctures the uplink control information in a duration overlapping with a transmission duration of the uplink data channel in a transmission duration of the uplink control channel, and transmits the uplink control information in a duration other than the duration overlapping with the transmission duration of the uplink data channel.

In the terminal according to an embodiment of the present disclosure, the transmitter multiplexes the uplink control information on the uplink data channel to transmit the multiplexed uplink control information on the uplink data channel, when the target error rate of the uplink data is equal to or less than a predetermined value.

In the terminal according to an embodiment of the present disclosure, the uplink control information is a response signal to downlink data, and at least one of a parameter for controlling a resource amount required for the response signal in the uplink data channel and a parameter for controlling an upper limit of the resource amount is configured according to the requirement of the uplink data.

In the terminal according to an embodiment of the present disclosure, the transmitter drops the uplink control information in the uplink control channel and transmits the uplink data using the uplink data channel when a certain parameter is indicated from a base station to the terminal.

In the terminal according to an embodiment of the present disclosure, transmission of the uplink data channel includes transmission using a resource dynamically indicated from a base station to the terminal, and transmission using a resource semi-statically allocated to the terminal.

In the terminal according to an embodiment of the present disclosure, the requirement includes a target error rate, and the circuitry determines the processing mode for the uplink data and the uplink control information according to the target error rate of the uplink data and the target error rate of the uplink control information.

In the terminal according to an embodiment of the present disclosure, the requirement includes a target error rate, and the circuitry determines the processing mode for the uplink data signal and the uplink control information according to the target error rate of the uplink data and the target error rate of the uplink control information that is repeatedly transmitted.

In the terminal according to an embodiment of the present disclosure, transmission of the uplink data channel includes transmission using a resource dynamically indicated from a base station to the terminal, and transmission using a resource semi-statically allocated to the terminal.

A communication method according to the present disclosure includes: determining a processing mode for uplink data and uplink control information according to a requirement for at least either of the uplink data and the uplink control information when transmission of an uplink data channel including the uplink data and transmission of an uplink control channel including the uplink control information overlap in time with each other; and transmitting at least either of the uplink data and the uplink control information based on the determined processing mode.

The disclosure of Japanese Patent Application No. 2018-144984, filed on Aug. 1, 2018, including the specification, drawings, and abstract is incorporated herein by reference in its entirety.

INDUSTRIAL APPLICABILITY

One exemplary embodiment of the present disclosure is useful in mobile communication systems.

REFERENCE SIGNS LIST

100 Base station
101, 211 Controller
102 Data generator
103, 107, 110, 212, 214 Encoder
104 Retransmission controller
105, 108, 111, 213, 215 Modulator
106 Higher-layer control signal generator
109 Downlink control signal generator
112, 216 Signal assigner
113, 217 Inverse Fast Fourier Transformer (IFFT)
114, 218 Transmitter
115, 201 Antenna
116, 202 Receiver
117, 203 Fast Fourier Transformer (FFT)
118, 204 Extractor
119, 122 Demodulator
120, 123, 206, 208, 210 Decoder
121, 124 Determiner
200 Terminal
205 Downlink control signal demodulator 207 Higher-layer control signal demodulator
209 Data demodulator

The invention claimed is:

1. A communication apparatus comprising:
circuitry, which, in operation, determines a number of resources for multiplexing Hybrid Automatic Repeat Request Acknowledgement (HARQ-ACK) information in a Physical Uplink Shared Channel (PUSCH) by using an offset value corresponding to a priority of the HARQ-ACK information; and
a transmitter, which, in operation, transmits the HARQ-ACK information.

2. The communication apparatus according to claim 1, wherein the priority is defined for the multiplexed HARQ-ACK information and the offset value is selected from a plurality of different offset values which correspond to different in-PUSCH-multiplexed HARQ-ACK priorities.

3. The communication apparatus according to claim 1, wherein a first offset value is configured for a first priority of first HARQ-ACK information and a second offset value is configured for a second priority of second HARQ-ACK, the first offset value being different from the second offset value.

4. The communication apparatus according to claim 3, wherein the first offset value and the second offset value are configured by a higher layer signalling.

5. The communication apparatus according to claim 3, wherein the first offset value and the second offset value are configured by downlink control information.

6. The communication apparatus according to claim 3, wherein the circuitry, in operation, determines a first number of first resources for multiplexing the first HARQ-ACK information in the PUSCH and a second number of second resources for multiplexing the second HARQ-ACK information in the PUSCH, and
the second number of the second resources is determined based on the determined first number of the first resources when the first priority of the first HARQ-ACK information is higher than the second priority of the second HARQ-ACK information.

7. The communication apparatus according to claim 1, wherein the priority of the HARQ-ACK information is comparable to a priority of scheduled transmission of the PUSCH, and the circuitry determines whether the circuitry multiplexes the HARQ-ACK information in the PUSCH by comparing the priority of the HARQ-ACK information and the priority of the scheduled transmission of the PUSCH.

8. The communication apparatus according to claim 1, wherein the priority of the HARQ-ACK information multiplexed in the PUSCH is a different parameter from a priority of HARQ-ACK information that is not multiplexed in the PUSCH.

9. The communication apparatus according to claim 1, wherein the offset value is a parameter for controlling a coding rate of the HARQ-ACK information.

10. A communication method comprising:
determining a number of resources for multiplexing Hybrid Automatic Repeat Request Acknowledgement (HARQ-ACK) information in a Physical Uplink Shared Channel (PUSCH) by using an offset value corresponding to a priority of the HARQ-ACK information; and
transmitting the HARQ-ACK information.

11. The communication method according to claim 10, wherein the priority is defined for the multiplexed HARQ-ACK information and the offset value is selected from a plurality of different offset values which correspond to different in-PUSCH-multiplexed HARQ-ACK priorities.

12. The communication method according to claim 10, wherein a first offset value is configured for a first priority of first HARQ-ACK information and a second offset value is configured for a second priority of second HARQ-ACK, the first offset value being different from the second offset value.

13. The communication method according to claim 12, wherein the first offset value and the second offset value are configured by a higher layer signalling.

14. The communication method according to claim 12, wherein the first offset value and the second offset value are configured by downlink control information.

15. The communication method according to claim 12, comprising:
determining a first number of first resources for multiplexing the first HARQ-ACK information in the PUSCH, and a second number of second resources for multiplexing the second HARQ-ACK information in the PUSCH,
wherein the second number of the second resources is determined based on the determined first number of the first resources when the first priority of the first HARQ-ACK information is higher than the second priority of the second HARQ-ACK information.

16. The communication method according to claim 10, wherein the priority of the HARQ-ACK information is comparable to a priority of scheduled transmission of the PUSCH, and the method comprising:
determining whether to multiplex the HARQ-ACK information in the PUSCH by comparing the priority of the HARQ-ACK information and the priority of the scheduled transmission of the PUSCH.

17. The communication method according to claim 10, wherein the priority of the HARQ-ACK information multiplexed in the PUSCH is a different parameter from a priority of HARQ-ACK information that is not multiplexed in the PUSCH.

18. The communication method according to claim 10, wherein the offset value is a parameter for controlling a coding rate of the HARQ-ACK information.

* * * * *